US011369001B2

United States Patent
Sengupta et al.

(10) Patent No.: US 11,369,001 B2
(45) Date of Patent: *Jun. 21, 2022

(54) RESOURCE MANAGEMENT, ACCESS CONTROL AND MOBILITY FOR GRANT-FREE UPLINK TRANSMISSION

(71) Applicant: QUALCOMM Incorporated, San Diego, CA (US)

(72) Inventors: Ayan Sengupta, San Diego, CA (US); Umesh Phuyal, San Diego, CA (US); Alberto Rico Alvarino, San Diego, CA (US); Le Liu, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 16/583,009

(22) Filed: Sep. 25, 2019

(65) Prior Publication Data

US 2020/0100318 A1 Mar. 26, 2020

Related U.S. Application Data

(60) Provisional application No. 62/737,101, filed on Sep. 26, 2018.

(51) Int. Cl.
*H04L 5/00* (2006.01)
*H04L 5/10* (2006.01)
(Continued)

(52) U.S. Cl.
CPC ......... *H04W 76/36* (2018.02); *H04J 13/0062* (2013.01); *H04L 5/0051* (2013.01);
(Continued)

(58) Field of Classification Search
CPC ..... H04W 76/27; H04W 76/30; H04W 76/34; H04W 76/36; H04W 68/02; H04W 74/02;
(Continued)

(56) References Cited

U.S. PATENT DOCUMENTS

2018/0139778 A1* 5/2018 Chou .................... H04W 74/04
2018/0146398 A1 5/2018 Kim et al.
(Continued)

FOREIGN PATENT DOCUMENTS

WO    WO-2020032659 A1 * 2/2020 ........ H04W 56/0045

OTHER PUBLICATIONS

CMCC: "Discussion on UE States in NR", 3GPP Draft; R2-165211 Discussion on UE States in NR, 3RD Generation Partnership Project (3GPP), Mobile Competence Centre ; 650, Route Des Lucioles ; F-06921 Sophia-Antipolis Cedex ; France, vol. RAN WG2, No. Goteborg; Aug. 22-26, 2016, Aug. 21, 2016 (Aug. 21, 2016), XP051126809, 5 Pages, Retrieved from the Internet: URL:http://www.3gpp.org/ftp/Meetings_3GPP_SYNC/RAN2/Docs/ [retrieved on Aug. 21, 2016].

(Continued)

*Primary Examiner* — Iqbal Zaidi
(74) *Attorney, Agent, or Firm* — Holland & Hart LLP

(57) ABSTRACT

Methods, systems, and devices for wireless communications are described. A user equipment (UE) may receive a connection release message, the connection release message including a resource indicator indicating that a set of resources are to be used for grant-free uplink transmissions by the UE while operating in a disconnected state. The UE may transition from a connected state to a disconnected state based at least in part on the connection release message. The UE may perform, while operating in the disconnected state, the grant-free uplink transmissions using the set of resources.

56 Claims, 16 Drawing Sheets

(51) Int. Cl.

| | | |
|---|---|---|
| *H04W 76/30* | (2018.01) | |
| *H04W 68/02* | (2009.01) | |
| *H04W 74/02* | (2009.01) | |
| *H04W 72/04* | (2009.01) | |
| *H04W 74/08* | (2009.01) | |
| *H04W 76/27* | (2018.01) | |
| *H04W 76/36* | (2018.01) | |
| *H04W 36/08* | (2009.01) | |
| *H04W 72/12* | (2009.01) | |
| *H04W 68/00* | (2009.01) | |
| *H04J 13/00* | (2011.01) | |

(52) U.S. Cl.
CPC .............. *H04L 5/10* (2013.01); *H04W 36/08* (2013.01); *H04W 68/005* (2013.01); *H04W 68/02* (2013.01); *H04W 72/042* (2013.01); *H04W 72/048* (2013.01); *H04W 72/0446* (2013.01); *H04W 72/1284* (2013.01); *H04W 74/02* (2013.01); *H04W 74/08* (2013.01); *H04W 76/27* (2018.02); *H04W 76/30* (2018.02)

(58) Field of Classification Search
CPC .............. H04W 74/08; H04W 72/042; H04W 72/0446; H04W 72/048; H04L 1/0004; H04L 27/26
See application file for complete search history.

(56) References Cited

U.S. PATENT DOCUMENTS

| | | | |
|---|---|---|---|
| 2018/0206262 A1 | 7/2018 | Cao et al. | |
| 2018/0227961 A1 | 8/2018 | Mallick et al. | |
| 2018/0234941 A1* | 8/2018 | Kim | H04W 76/19 |
| 2018/0270812 A1 | 9/2018 | Lee et al. | |
| 2018/0288746 A1* | 10/2018 | Zhang | H04L 1/0031 |
| 2018/0295651 A1 | 10/2018 | Cao et al. | |
| 2018/0332606 A1 | 11/2018 | Lee et al. | |
| 2018/0367273 A1* | 12/2018 | Park | H04L 41/06 |
| 2019/0053319 A1* | 2/2019 | Jeon | H04L 5/0098 |
| 2019/0141694 A1* | 5/2019 | Gupta | H04W 24/10 |
| 2019/0166553 A1* | 5/2019 | Ryoo | H04W 74/0833 |
| 2019/0246378 A1 | 8/2019 | Islam et al. | |
| 2019/0246420 A1 | 8/2019 | Park et al. | |
| 2019/0289570 A1 | 9/2019 | Kim et al. | |
| 2019/0327649 A1 | 10/2019 | Liu et al. | |
| 2020/0037297 A1 | 1/2020 | Pan et al. | |
| 2020/0037345 A1 | 1/2020 | Ryoo et al. | |
| 2020/0100320 A1 | 3/2020 | Sengupta et al. | |
| 2020/0100321 A1 | 3/2020 | Sengupta et al. | |
| 2020/0137825 A1 | 4/2020 | Sengupta et al. | |
| 2020/0205106 A1 | 6/2020 | Shreevastav et al. | |
| 2020/0252958 A1 | 8/2020 | Lu et al. | |
| 2020/0267696 A1 | 8/2020 | Li et al. | |
| 2020/0280894 A1 | 9/2020 | Koskinen et al. | |
| 2020/0329410 A1 | 10/2020 | Hong | |
| 2021/0076308 A1 | 3/2021 | Kim et al. | |

OTHER PUBLICATIONS

Ericsson: "0 ms Support During Handover Procedure with Dual Tx_Rx", 3GPP Draft; R2-1702719-0 MS Support During Handover Procedure With Dual TX_RX, 3RD Generation Partnership Project (3GPP), Mobile Competence Centre ; 650, Route Des Lucioles ; F-06921 Sophia-Antipolis, vol. RAN WG2, No. Spokane, USA; Apr. 3-7, 2017, Apr. 3, 2017 (Apr. 2, 2017), XP051244712, 4 Pages, Retrieved from the Internet: URL:http://www.3gpp.org/ftp/Meetings_3GPP_SYNC/RAN2/Docs/ [retrieved on Apr. 3, 2017].

Huawei et al., "Inter-RAT Mobility for Inactive UE", 3GPP Draft; R2-1712573, 3RD Generation Partnership Project (3GPP), Mobile Competence Centre ; 650, Route Des Lucioles ; F-06921 Sophia-Antipolis Cedex; France, vol. RAN WG2, No. Reno, US; Nov. 27-Dec. 1, 2017, Nov. 17, 2017 (Nov. 17, 2017), XP051371535, 5 Pages, Retrieved from the Internet: URL:http://www.3gpp.org/ftp/tsg%5Fran/WG2%5FRL2/TSGR2%5F100/Docs/ [retrieved on Nov. 17, 2017].

Huawei Hisilicon: "UL Data Transmission in RRC_Inactive", 3GPP Draft; R2-168544 UL Data Transmission In RRC Inactive, 3RD Generation Partnership Project (3GPP), Mobile Competence Centre ; 650, Route Des Lucioles ; F-06921 Sophia-Antipolis Cedex; France, vol. RAN WG2, No. Reno, Nevada, USA; Nov. 14-18, 2016, Nov. 13, 2016 (Nov. 13, 2016), XP051178119, 8 Pages, Retrieved from the Internet: URL:http://www.3gpp.org/ftp/Meetings_3GPP_SYNC/RAN2/Docs/ [retrieved on Nov. 13, 2016], pp. 1-4.

Samsung: "UE Energy Consumption Analysis for Data Transfer in Inactive State", 3GPP Draft; R2-1701531 Inactive Data UE Energy Consumption, 3RD Generation Partnership Project (3GPP), Mobile Competence Centre ; 650, Route Des Lucioles ; F-06921 Sophia-Antipolis Cedex; France, vol. RAN WG2, No. Athens, Greece; Feb. 13-17, 2017, Feb. 12, 2017 (Feb. 12, 2017), XP051212157, 5 Pages, Retrieved from the Internet: URL:http://www.3gpp.org/ftp/Meetings_3GPP_SYNC/RAN2/Docs/ [retrieved on Feb. 12, 2017].

Samsung: "Data Transfer in Inactive State Based on 4-step RACH Procedures", 3GPP Draft; R2-1701529 Inactive Data On 4-Step RACH, 3RD Generation Partnership Project (3GPP), Mobile Competence Centre, 650, Route Des Lucioles, F-06921 Sophia-Antipolis Cedex, France, vol. RAN WG2, No. Athens, Greece; Feb. 13-17, 2017, Feb. 12, 2017 (Feb. 12, 2017), XP051212155, 7 Pages, Retrieved from the Internet: URL:http://www.3gpp.org/ftp/Meetings_3GPP_SYNC/RAN2/Docs/ [retrieved on Feb. 12, 2017].

Sierra Wireless: "Transmission of Data Grant-Free in Inactive State", 3GPP Draft; R2-168595, 3RD Generation Partnership Project (3GPP), Mobile Competence Centre, 650, Route Des Lucioles, F-06921 Sophia-Antipolis Cedex, France, vol. RAN WG2, No. Reno, Nevada, USA; Nov. 14-18, 2016, Nov. 13, 2016 (Nov. 13, 2016), XP051178165, 10 Pages, Retrieved from the Internet: URL:http://www.3gpp.org/ftp/Meetings_3GPP_SYNC/RAN2/Docs/[retrieved on Nov. 13, 2016], pp. 1-7.

Spreadtrum Communications: "UL Data Transmission in Inactive", 3GPP Draft; R2-1804471 UL Data Transmission In Inactive, 3RD Generation Partnership Project (3GPP), Mobile Competence Centre, 650, Route Des Lucioles ; F-06921 Sophia-Antipolis Cedex, France, vol. RAN WG2, No. Sanya, China; Apr. 16-20, 2018, Apr. 14, 2018 (Apr. 14, 2018), XP051428207, 2 Pages, Retrieved from the Internet: URL:http://www.3gpp.org/ftp/Meetings%5F3GPP%5FSYNC/RAN2/Docs/ [retrieved on Apr. 14, 2018].

Huawei et al., "Access Control in NR for RRC_CONNECTED", 3GPP Draft; R2-1709551 Access Control In NR For RRC_CONNECTED, 3RD Generation Partnership Project (3GPP), Mobile Competence Centre ; 650, Route Des Lucioles ; F-06921 Sophia-Antipolis Cedex; France, vol. RAN WG2, No. Berlin, Germany; Aug. 21-25, 2017, Aug. 20, 2017 (Aug. 20, 2017), XP051319270, 4 Pages, Retrieved from the Internet: URL:http://www.3gpp.org/ftp/Meetings_3GPP_SYNC/RAN2/Docs/ [retrieved on Aug. 20, 2017].

Institute for Information Industry (III): "Considerations on Signalling Overhead and Latency in RRC_INACTIVE", 3GPP Draft, 3GPP TSG-RAN WG2 NR AH1807 Meeting, R2-1810017_Considerations on Signalling Overhead and Latency in RRC_INACTIVE, 3RD Generation Partnership Project (3GPP), Mobile Competence Centre, 650, Route Des Lucioles, F-06921 Sophia, vol. RAN WG2, No. Montreal, Canada, Jul. 2-6, 2018 Jul. 1, 2018 (Jul. 1, 2018), XP051467251, pp. 1-3, Retrieved from the Internet: URL:http://www.3gpp.org/ftp/Meetings%5F3GPP%5FSYNC/RAN2/Docs [retrieved on Jul. 1, 2018].

International Search Report and Written Opinion—PCT/US2019/053118—ISA/EPO—dated Dec. 18, 2019.

Nokia et al., "Access Control in NG-RAN", 3GPP Draft; R2-1705324 Access Control In NG-RAN, 3RD Generation Partnership Project (3GPP), Mobile Competence Centre ; 650, Route Des Lucioles ; F-06921 Sophia-Antipolis Cedex ; France, vol. RAN WG2, No. Hangzhou, China; May 15-19, 2017, May 14, 2017 (May 14, 2017), XP051275764, 5 Pages, Retrieved from the Internet: URL:http://

(56) References Cited

OTHER PUBLICATIONS www.3gpp.org/ftp/Meetings_3GPP_SYNC/RAN2/Docs/ [retrieved on May 14, 2017] pp. 2, 3 Access Barring design, pp. 3-4, 4 Access Control applicability, tables 1,2.

SAMSUNG: "Scenarios for Data Transfer in Inactive and related Performance Requirements", 3GPP Draft; R2-1700365, 3RD Generation Partnership Project (3GPP), Mobile Competence Centre ; 650, Route Des Lucioles ; F-06921 Sophia-Antipolis Cedex; France, vol. RAN WG2, No. Spokane, USA; Jan. 17-19, 2017, Jan. 17, 2017 (Jan. 17, 2017), XP051210944, 4 Pages, Retrieved from the Internet: URL:http://www.3gpp.org/ftp/Meetings_3GPP_SYNC/RAN2/Docs/ [retrieved on Jan. 17, 2017].

* cited by examiner

RESOURCE MANAGEMENT, ACCESS CONTROL AND MOBILITY FOR GRANT-FREE UPLINK TRANSMISSION

CROSS REFERENCE

The present Application for Patent claims the benefit of U.S. Provisional Patent Application No. 62/737,101 by SENGUPTA, et al., entitled "RESOURCE MANAGEMENT, ACCESS CONTROL AND MOBILITY FOR GRANT-FREE UPLINK TRANSMISSION," filed Sep. 26, 2018, assigned to the assignee hereof, and expressly incorporated herein.

BACKGROUND

The following relates generally to wireless communications, and more specifically to resource management, access control and mobility for grant-free uplink transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may use various transmission schemes to support communications between a UE and base station. In some examples, the transmission schemes may support uplink transmissions based, at least in some aspects, on a random access procedure. For example, some legacy transmission schemes may support a four-step uplink random access procedure that allows data transmission in message five (Msg5) of the random access procedure. Another legacy transmission scheme may support early data transmission, which generally utilizes a two-step uplink access procedure that allows data transmission in message three (Msg3) of the random access procedure.

In some examples, the transmission scheme may support uplink data transmissions in message one (Msg1) using configured resources. Certain aspects of this transmission scheme may be supported when the UE has a valid timing advance (TA), such as when the UE is stationary. This transmission scheme may also be considered a grantless or grant-free transmission, which may also be referred to as an autonomous uplink (AUL) transmission. However, conventional techniques do not provide a mechanism for the grant-free uplink transmissions to be performed while the UE is operating in a disconnected state using resources configured for the UE.

SUMMARY

The described techniques relate to improved methods, systems, devices, and apparatuses that support resource management, access control and mobility for grant-free uplink transmission. Generally, the described techniques provide for higher layer management of resources used by the UE to perform autonomous uplink (AUL) transmissions while the UE is operating in a disconnected state. For example, a set of resources may be configured for the UE to use when operating in a disconnected state. The resources may be configured while the UE is operating in a connected state (such as a radio resource control (RRC) connected state) and/or upon release of the UE from the connected state. Upon a release of the connected state, the UE may transition to a disconnected state (e.g., such as an RRC idle or inactive mode or state). In some aspects, the signal releasing the UE from the connected state (e.g., a connection release message) may carry an explicit or implicit indication of whether the configured resources are to be used by the UE while operating in the disconnected state. The UE may receive the connection release message and determine whether a resource indicator in the connection release message indicates that the set of resources are activated or inactive (e.g., are available or are released) for the UE. When available, the UE may perform grant-free uplink transmissions using the set of resources while operating in the disconnected state. Aspects of the described techniques also provide mechanisms for the release and/or expiration of the resources, handover control, cell reselection, and the like.

A method of wireless communication at a UE is described. The method may include receiving a connection release message, the connection release message including a resource indicator indicating that a set of resources are to be used for grant-free uplink transmissions by the UE while operating in a disconnected state, transitioning from a connected state to a disconnected state based on the connection release message, and performing, while operating in the disconnected state, the grant-free uplink transmissions using the set of resources.

An apparatus for wireless communication at a UE is described. The apparatus may include a processor, memory in electronic communication with the processor, and instructions stored in the memory. The instructions may be executable by the processor to cause the apparatus to receive a connection release message, the connection release message including a resource indicator indicating that a set of resources are to be used for grant-free uplink transmissions by the UE while operating in a disconnected state, transition from a connected state to a disconnected state based on the connection release message, and perform, while operating in the disconnected state, the grant-free uplink transmissions using the set of resources.

Another apparatus for wireless communication at a UE is described. The apparatus may include means for receiving a connection release message, the connection release message including a resource indicator indicating that a set of resources are to be used for grant-free uplink transmissions by the UE while operating in a disconnected state, transitioning from a connected state to a disconnected state based on the connection release message, and performing, while operating in the disconnected state, the grant-free uplink transmissions using the set of resources.

A non-transitory computer-readable medium storing code for wireless communication at a UE is described. The code may include instructions executable by a processor to receive a connection release message, the connection release message including a resource indicator indicating that a set of resources are to be used for grant-free uplink transmissions by the UE while operating in a disconnected state, transition from a connected state to a disconnected state based on the connection release message, and perform, while operating in the disconnected state, the grant-free uplink transmissions using the set of resources.

Some examples of the method, apparatuses, and non-transitory computer-readable medium described herein may further include operations, features, means, or instructions for determining that the resource indicator in the connection release message indicates information associated with the set of resources.

Some examples of the method, apparatuses, and non-transitory computer-readable medium described herein may further include operations, features, means, or instructions for confirming, based on the determining, that the set of resources may be available to use for grant-free uplink transmissions while operating in the disconnected state.

Some examples of the method, apparatuses, and non-transitory computer-readable medium described herein may further include operations, features, means, or instructions for releasing, based on the determining, the set of resources to use for grant-free uplink transmissions while operating in the disconnected state.

Some examples of the method, apparatuses, and non-transitory computer-readable medium described herein may further include operations, features, means, or instructions for determining that the resource indicator in the connection release message implicitly indicates information associated with the set of resources.

Some examples of the method, apparatuses, and non-transitory computer-readable medium described herein may further include operations, features, means, or instructions for releasing, based on the determining, the set of resources to use for grant-free uplink transmissions while operating in the disconnected state.

Some examples of the method, apparatuses, and non-transitory computer-readable medium described herein may further include operations, features, means, or instructions for confirming, based on the determining, that the set of resources may be available to use for grant-free uplink transmissions while operating in the disconnected state.

Some examples of the method, apparatuses, and non-transitory computer-readable medium described herein may further include operations, features, means, or instructions for transmitting a connection release acknowledgment message responsive to receiving the connection release message.

Some examples of the method, apparatuses, and non-transitory computer-readable medium described herein may further include operations, features, means, or instructions for determining that a retransmission request message was not received from the base station during a time period and transitioning to the disconnected state at an end of the time period based on the determining.

In some examples of the method, apparatuses, and non-transitory computer-readable medium described herein, the time period includes at least one of a time period configured by a network entity, or a preconfigured time period, or a combination thereof.

Some examples of the method, apparatuses, and non-transitory computer-readable medium described herein may further include operations, features, means, or instructions for transmitting, while operating in the connected state, at least one of a request for additional resources, or a traffic level indicator, or a combination thereof.

In some examples of the method, apparatuses, and non-transitory computer-readable medium described herein, the grant-free uplink transmissions include at least one of a request for additional resources, or a traffic level indicator, or a combination thereof.

Some examples of the method, apparatuses, and non-transitory computer-readable medium described herein may further include operations, features, means, or instructions for transmitting at least one of a request for additional resources, or a traffic level indicator, or a combination thereof, in a UE capability signal.

Some examples of the method, apparatuses, and non-transitory computer-readable medium described herein may further include operations, features, means, or instructions for performing a handover from the base station to a neighboring base station and transmitting an indication that the set of resources may be to be configured by the neighboring base station in response to the UE performing the handover.

In some examples of the method, apparatuses, and non-transitory computer-readable medium described herein, the indication may be transmitted in a RRC message or in a disconnected state release/keep alive message.

Some examples of the method, apparatuses, and non-transitory computer-readable medium described herein may further include operations, features, means, or instructions for determining that the set of resource may be unused for a time period and releasing the set of resources based on the determining.

Some examples of the method, apparatuses, and non-transitory computer-readable medium described herein may further include operations, features, means, or instructions for receiving a release message from the base station de-configuring the set of resources.

Some examples of the method, apparatuses, and non-transitory computer-readable medium described herein may further include operations, features, means, or instructions for receiving a reconfiguration message from the base station reconfiguring one or more parameters associated with the set of resources.

Some examples of the method, apparatuses, and non-transitory computer-readable medium described herein may further include operations, features, means, or instructions for determining that a clock drift level may have degraded below a threshold level and releasing the set of resource based on the determining.

Some examples of the method, apparatuses, and non-transitory computer-readable medium described herein may further include operations, features, means, or instructions for adjusting a cell reselection parameter based on the set of resources being configured for use for grant-free uplink transmissions.

Some examples of the method, apparatuses, and non-transitory computer-readable medium described herein may further include operations, features, means, or instructions for receiving, from the base station, a transition request message and transitioning to the connected state based on the transition request message.

Some examples of the method, apparatuses, and non-transitory computer-readable medium described herein may further include operations, features, means, or instructions for receiving, while the UE may be operating in the connected state, a message configuring the set of resources to be used for grant-free uplink transmissions, where resource indicator identifies whether the set of resources may be activated.

In some examples of the method, apparatuses, and non-transitory computer-readable medium described herein, the set of resources include a demodulation reference signal (DMRS) identifier and corresponding DMRS resource to use for the grant-free uplink transmission, the DMRS identifier including at least one of a DMRS sequence, or a cyclic shift, or a frequency-domain comb pattern, or an orthogonal cover code pattern across time, or a Zadoff-Chu root, or a combination thereof.

In some examples of the method, apparatuses, and non-transitory computer-readable medium described herein, the message includes a radio resource control message.

In some examples of the method, apparatuses, and non-transitory computer-readable medium described herein, the set of resources include a DMRS identifier and corresponding DMRS resource to use for the grant-free uplink transmission, the DMRS identifier including at least one of a DMRS sequence, or a cyclic shift, or a frequency-domain comb pattern, or an orthogonal cover code pattern across time, or a Zadoff-Chu root, or a combination thereof.

In some examples of the method, apparatuses, and non-transitory computer-readable medium described herein, the connection release message includes the resource indicator identifying the set of resources.

In some examples of the method, apparatuses, and non-transitory computer-readable medium described herein, the grant-free uplink transmissions include a RACH message 1 (Msg1) transmission.

A method of wireless communication at a base station is described. The method may include configuring a set of resources for a UE to use for grant-free uplink transmissions while the UE is operating in a disconnected state, transmitting a connection release message that includes a resource indicator to the UE, the resource indicator indicating the set of resources configured for the UE, the connection release message transitioning the UE from a connected state to the disconnected state, and receiving, while the UE is operating in the disconnected state, the grant-free uplink transmissions from the UE using the set of resources configured for the UE.

An apparatus for wireless communication at a base station is described. The apparatus may include a processor, memory in electronic communication with the processor, and instructions stored in the memory. The instructions may be executable by the processor to cause the apparatus to configure a set of resources for a UE to use for grant-free uplink transmissions while the UE is operating in a disconnected state, transmit a connection release message that includes a resource indicator to the UE, the resource indicator indicating the set of resources configured for the UE, the connection release message transitioning the UE from a connected state to the disconnected state, and receive, while the UE is operating in the disconnected state, the grant-free uplink transmissions from the UE using the set of resources configured for the UE.

Another apparatus for wireless communication at a base station is described. The apparatus may include means for configuring a set of resources for a UE to use for grant-free uplink transmissions while the UE is operating in a disconnected state, transmitting a connection release message that includes a resource indicator to the UE, the resource indicator indicating the set of resources configured for the UE, the connection release message transitioning the UE from a connected state to the disconnected state, and receiving, while the UE is operating in the disconnected state, the grant-free uplink transmissions from the UE using the set of resources configured for the UE.

A non-transitory computer-readable medium storing code for wireless communication at a base station is described. The code may include instructions executable by a processor to configure a set of resources for a UE to use for grant-free uplink transmissions while the UE is operating in a disconnected state, transmit a connection release message that includes a resource indicator to the UE, the resource indicator indicating the set of resources configured for the UE, the connection release message transitioning the UE from a connected state to the disconnected state, and receive, while the UE is operating in the disconnected state, the grant-free uplink transmissions from the UE using the set of resources configured for the UE.

Some examples of the method, apparatuses, and non-transitory computer-readable medium described herein may further include operations, features, means, or instructions for configuring the resource indicator in the connection release message to implicitly indicate information associated with the set of resources.

Some examples of the method, apparatuses, and non-transitory computer-readable medium described herein may further include operations, features, means, or instructions for releasing, based on the configuring, the set of resources.

Some examples of the method, apparatuses, and non-transitory computer-readable medium described herein may further include operations, features, means, or instructions for confirming, based on the configuring, that the set of resources may be available to use for grant-free uplink transmissions while operating in the disconnected state.

Some examples of the method, apparatuses, and non-transitory computer-readable medium described herein may further include operations, features, means, or instructions for configuring the resource indicator in the connection release message to indicate information associated with the set of resources.

Some examples of the method, apparatuses, and non-transitory computer-readable medium described herein may further include operations, features, means, or instructions for confirming, based on the configuring, that the set of resources may be available to use for grant-free uplink transmissions while the UE may be operating in the disconnected state.

Some examples of the method, apparatuses, and non-transitory computer-readable medium described herein may further include operations, features, means, or instructions for releasing, based on the configuring, the set of resources.

Some examples of the method, apparatuses, and non-transitory computer-readable medium described herein may further include operations, features, means, or instructions for receiving a connection release acknowledgment message responsive to transmitting the connection release message.

Some examples of the method, apparatuses, and non-transitory computer-readable medium described herein may further include operations, features, means, or instructions for receiving, while the UE may be operating in the connected state, at least one of a request for additional resources, or a traffic level indicator, or a combination thereof.

In some examples of the method, apparatuses, and non-transitory computer-readable medium described herein, the grant-free uplink transmissions includes at least one of a request for additional resources, a traffic level indicator, or a combination thereof.

Some examples of the method, apparatuses, and non-transitory computer-readable medium described herein may further include operations, features, means, or instructions for receiving at least one of a request for additional resources, or a traffic level indicator, or a combination thereof, in a UE capability signal.

Some examples of the method, apparatuses, and non-transitory computer-readable medium described herein may further include operations, features, means, or instructions for determining that the UE may have performed a handover from the base station to a neighboring base station and transmitting an indication that the set of resources may be released in response to the UE performing the handover.

Some examples of the method, apparatuses, and non-transitory computer-readable medium described herein may further include operations, features, means, or instructions for determining that the set of resource may be unused for a time period and releasing the set of resources based on the determining.

Some examples of the method, apparatuses, and non-transitory computer-readable medium described herein may further include operations, features, means, or instructions for transmitting a release message to the UE de-configuring the set of resources.

Some examples of the method, apparatuses, and non-transitory computer-readable medium described herein may further include operations, features, means, or instructions for determining that the UE may be associated with a defined access class, where the release message may be transmitted based on the determining.

Some examples of the method, apparatuses, and non-transitory computer-readable medium described herein may further include operations, features, means, or instructions for determining that the UE may have transitioned from the disconnected state to the connected state, where the release message may be transmitted based on the determining.

Some examples of the method, apparatuses, and non-transitory computer-readable medium described herein may further include operations, features, means, or instructions for determining that a paging message may be to be transmitted to the UE, where the release message may be transmitted based on the determining and the paging message includes the release message, at least in some aspects.

Some examples of the method, apparatuses, and non-transitory computer-readable medium described herein may further include operations, features, means, or instructions for transmitting a reconfiguration message to the UE reconfiguring one or more parameters associated with the set of resources.

Some examples of the method, apparatuses, and non-transitory computer-readable medium described herein may further include operations, features, means, or instructions for transmitting, to the UE, a transition request message.

Some examples of the method, apparatuses, and non-transitory computer-readable medium described herein may further include operations, features, means, or instructions for transmitting, while the UE may be operating in the connected state, a message configuring the set of resources to be used for grant-free uplink transmissions, where resource indicator identifies whether the set of resources may be activated.

In some examples of the method, apparatuses, and non-transitory computer-readable medium described herein, the set of resources include a DMRS identifier and corresponding DMRS resource to use for the grant-free uplink transmission, the DMRS identifier including at least one of a DMRS sequence, or a cyclic shift, or a frequency-domain comb pattern, or an orthogonal cover code pattern across time, or a Zadoff-Chu root, or a combination thereof.

In some examples of the method, apparatuses, and non-transitory computer-readable medium described herein, the message includes a radio resource control message.

In some examples of the method, apparatuses, and non-transitory computer-readable medium described herein, the set of resources include a DMRS identifier and corresponding DMRS resource to use for the grant-free uplink transmission, the DMRS identifier including at least one of a DMRS sequence, or a cyclic shift, or a frequency-domain comb pattern, or an orthogonal cover code pattern across time, or a Zadoff-Chu root, or a combination thereof.

In some examples of the method, apparatuses, and non-transitory computer-readable medium described herein, the connection release message includes the resource indicator identifying the set of resources.

DETAILED DESCRIPTION

Figure 1:
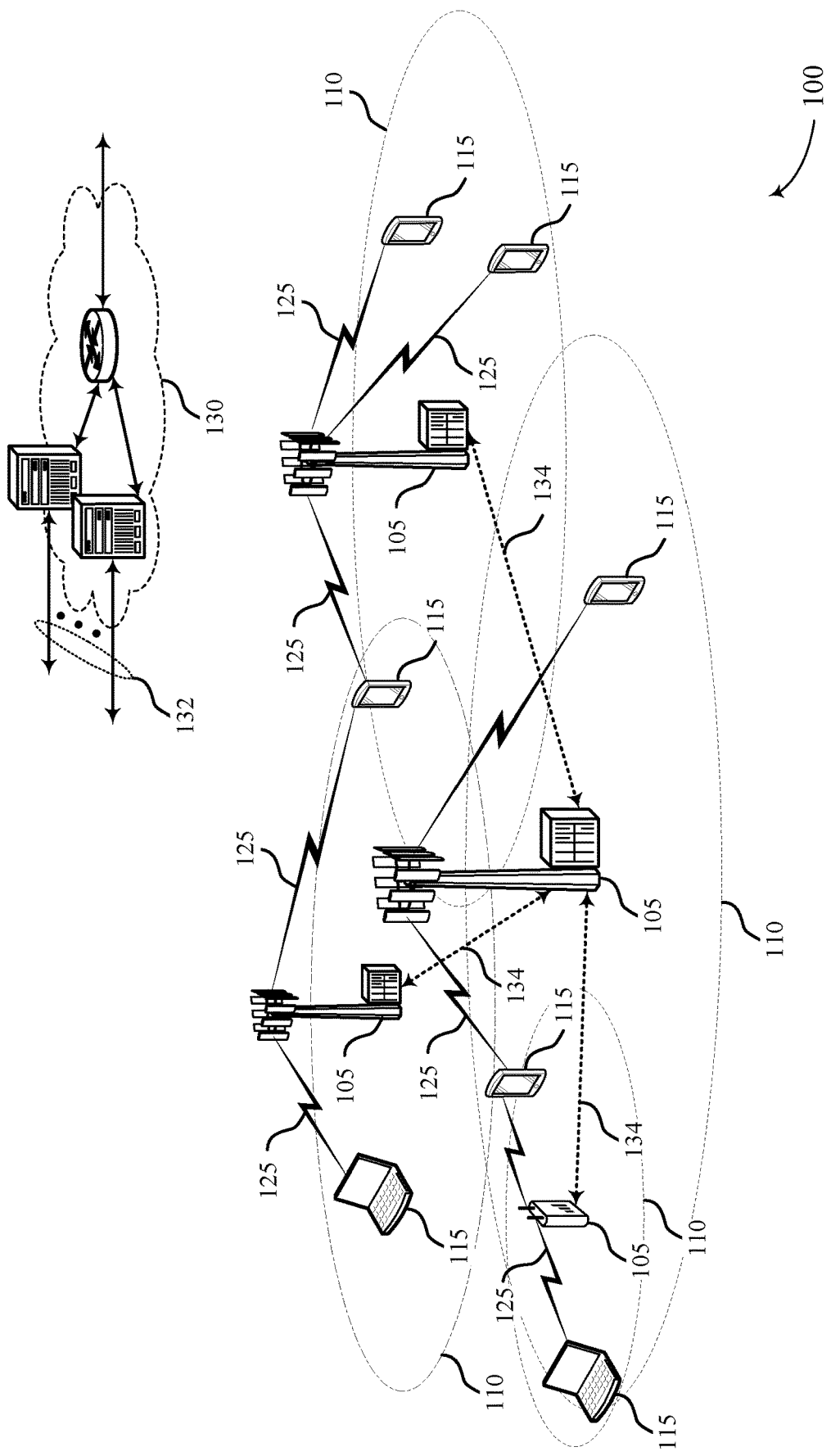
FIG. 1 illustrates an example of a system for wireless communications that supports resource management, access control and mobility for grant-free uplink transmission in accordance with aspects of the present disclosure.

Wireless communication systems may use various transmission schemes to support communications between a user equipment (UE) and base station. For example, the transmission schemes may support uplink transmissions based, at least in some aspects, on a random access procedure. For example, some legacy transmission schemes may support a four-step uplink random access procedure that allows data transmission in message five (Msg5) of the random access procedure. Another legacy transmission scheme may support early data transmission, which generally utilizes a two-step uplink access procedure that allows data transmission in message three (Msg3) of the random access procedure. This 2-step uplink access procedure may also be referred to as an early data transmission (EDT).

In some examples, the transmission scheme may support uplink transmissions in message one (Msg1) using configured resources. Certain aspects of this transmission scheme may be supported when the UE has a valid timing advance (TA), such as when the UE is stationary. This transmission scheme may also be considered a grantless or grant-free transmission in that at least some of the resources are configured for the UE, which may also be referred to as an autonomous uplink (AUL) transmission. However, conventional techniques do not provide a mechanism for the UE to perform grant-free uplink transmissions while the UE is operating in a disconnected state (e.g., such as a radio resource control (RRC) idle or inactive state).

Aspects of the disclosure are initially described in the context of a wireless communications system. Aspects of the disclosure provide for RRC-based negotiations for contention free resources. For example, the UE may be operating in a connected state (e.g. an RRC connected state) with an associated base station. Either while the UE is operating in the connected state and/or upon a release of the UE from the connected state, a set of resources may be configured for the UE to use for grant-free uplink transmissions while the UE is operating in a disconnected state (e.g., an RRC idle or inactive state). In some aspects, a connection release message may be used to carry or otherwise convey an indication of a resource indicator that indicates whether or not the set of resources are to be used for the grant-free uplink transmissions. The resource indicator may be explicit (e.g., a bit, a field, parameter, and the like) and/or may be implicit (e.g., may be absent or set to a NULL value). The UE may receive the connection release message and use the resource indicator to determine whether or not the set of resources are active (e.g., available) or inactive (e.g., released) for the UE. The UE may then transition from the connected state to the disconnected state responsive to the connection release message. When the set of resources are active (e.g., as is indicated by the resource indicator in the connection release message), the UE may perform the grant-free uplink transmissions using the set of resources while operating in the disconnected state. The grant-free uplink transmissions may include uplink data transmissions, a Msg1 transmission, a request for additional resources, a traffic level indicator, and the like.

Aspects of the disclosure are further illustrated by and described with reference to apparatus diagrams, system diagrams, and flowcharts that relate to resource management, access control and mobility for grant-free uplink transmission.

FIG. 1 illustrates an example of a wireless communications system 100 that supports resource management, access control and mobility for grant-free uplink transmission in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related.

The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a UE 115 may receive a connection release message, the connection release message including a resource indicator indicating that a set of resources are to be used for grant-free uplink transmissions by the UE 115 while operating in a disconnected state. The UE 115 may transition from a connected state to a disconnected state based at least in part on the connection release message. The UE 115 may perform, while operating in the disconnected state, the grant-free uplink transmissions using the set of resources.

In some aspects, a base station 105 may configure a set of resources for a UE 115 to use for grant-free uplink transmissions while the UE 115 is operating in a disconnected state. The base station 105 may transmit a connection release message that includes a resource indicator to the UE 115, the resource indicator indicating the set of resources configured for the UE 115 and transitioning the UE 115 from the connected state to the disconnected state. The base station 105 may receive, while the UE 115 is operating in the disconnected state, the grant-free uplink transmissions from the UE 115 using the set of resources configured for the UE 115.

Figure 2:
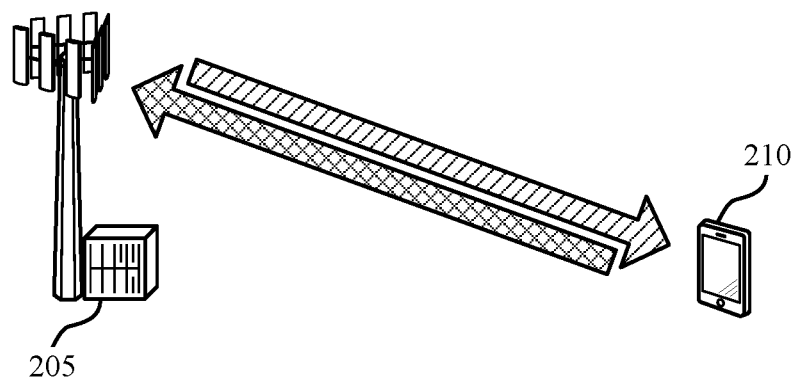
FIG. 2 illustrates an example of a wireless communication system that supports resource management, access control and mobility for grant-free uplink transmission in accordance with aspects of the present disclosure.

FIG. 2 illustrates an example of a wireless communication system 200 that supports resource management, access control and mobility for grant-free uplink transmission in accordance with aspects of the present disclosure. In some examples, wireless communication system 200 may implement aspects of wireless communication system 100. Wireless communication system 200 may include base station 205 and UE 210, which may be examples of the corresponding devices described herein.

Wireless communication system 200 may implement one or more transmission schemes that support uplink and/or downlink transmissions between base station 205 and UE 210. The transmission schemes may include legacy transmission schemes and/or non-legacy (e.g., NR) transmission schemes. Some transmission schemes may support uplink transmissions based on a random access procedure. One example legacy transmission scheme may support a four-step uplink random access procedure that allows data transmission in Msg5 of the random access procedure. Another example legacy transmission scheme may support EDT, which generally utilizes a two-step uplink access procedure that allows data transmission in Msg3 of the random access procedure.

Another example transmission scheme may support uplink data transmissions in Msg1 using configured resources. For example, this transmission scheme may be supported when the UE 210 has a valid TA, such as when the UE 210 is stationary. This transmission scheme may also be considered a grantless or grant-free transmission (e.g., AUL transmission) in that at least some of the resources are configured for UE 210, rather than being granted to or captured by UE 210 for the grant-free uplink transmission.

Accordingly, UE 210 may be configured to transmit an grant-free uplink transmission to base station 205 using a configured resource set. The configured resource set may be selected from a set of available configured resource sets. For example, base station 205 and/or a network entity may configure a resource set for UEs (such as UE 210) to use for performing grant-free uplink transmissions, e.g., uplink data transmissions, Msg1 transmissions, and the like. In some aspects, the resource set may be configured while the UE 210 is operating in a connected state (e.g., in RRC connected state or mode). In some aspects, this may include base station 205 and UE 210 exchanging one or more RRC messages to configure the set of resources for UE 210 to use while operating in the disconnected state (e.g., such as an RRC idle or inactive mode or state).

In other aspects, the set of resources may be configured upon release from the connected state. For example, base station 205 may transmit (and UE 210 may receive) a connection release message that may include a resource indicator that identifies the set of resources and/or conveys an indication of whether the resources are activated (e.g., available) or inactive (e.g., released) while UE 210 is operating in the disconnected state.

In some aspects, the set of resources configured for UE 210 to use for performing grant-free uplink transmissions while in the disconnected state may include time and/or frequency resources. In some aspects, the set of resources configured for UE 210 to use for performing grant-free uplink transmissions while in the disconnected state may include the assignment of a DMRS sequence and pattern. For example, the set of resources may be configured during RRC Connection Release/RRC suspension (e.g., via RRC Connection Release message). The establishment of the set of resources (e.g., Msg1 resources) by RRC may also include the assignment of a particular DMRS sequence and pattern. The set of resources may be established in a way that unique DMRS sequences/patterns are assigned to UEs, while the data resources may be unique (dedicated contention-free) or may at least partially overlap across UEs (shared contention-free)—the DMRS may be used for contention resolution.

In some aspects, UE 210 may transition from a connected state to a disconnected state. For example, base station 205 may transmit (and UE 210 may receive) a connection release message that carries or otherwise conveys the resource indicator that indicates whether the configured set of resources are to be used for grant-free uplink transmissions while the UE 210 is operating in the disconnected state. UE 210 may transition from the connected state to the disconnected state in response to receiving the connection release message.

As discussed, UE 210 may use the resource indicator carried or otherwise conveyed in the connection release message to determine whether the configured set of resources are active (e.g., available) or inactive (e.g., released) during the disconnected state of UE 210. In some aspects, the connection release message (e.g., RRC Connection Release message) may contain an implicit and/or explicit indication (e.g., implicit and/or explicit resource indicator). Based at least in part on the resource indicator (either implicit and/or explicit), UE 210 may determine at least one of the following, regarding the contention-free set of resources: UE 210 may continue to use the assigned Msg1 data resources (e.g., the set of resources) already (or previously) assigned; UE 210 may confirm the validity or invalidity of the Msg1 data resources already (or previously) assigned; de-configure (or release) the Msg1 data resources already (or previously) assigned; and/or assign a new Msg1 data resource.

As one example, upon receipt of the connection release message (e.g., an RRC Connection Release message), if there is no (e.g., an implicit indication of information associated with the set of resources) resource indicator for UE 210 to use regarding its Msg1 resources (e.g., set of resources), the existing Msg1 resources assigned to UE 210 are de-configured; whereas an indication—on the other hand—may imply either (i) confirmation that the existing set of resources remain valid, or (ii) that new resources have been assigned.

As another example, upon receipt of the connection release message (e.g., an RRC Connection Release message), if there is no (e.g., an implicit indication) resource indicator for UE 210 to use regarding its Msg1 resources, UE 210 may keep using the previously assigned resources (e.g., confirm that the set of resources are available); whereas an indication—on the other hand—may imply either (i) de-configuration of the set of resources, or (ii) a change in the set of resources. In some aspects, wireless communication system 200 may be configured to support UE 210 retaining an "old" RRC configuration. The chosen mechanism whereby the resource indicator is used to signal that the set of resources is active or inactive may be known by the UE 210 and base station 205 beforehand, thus can be interpreted correctly.

In some aspects, the confirmation of the validity of the configured set of resources by the connection release message may protect against certain base station 205 events, such as a base station 205 reset. The confirmation of validity of the configured set of resources can be a subset (or hash/ID) of the set of resources.

In some aspects, the fidelity of the RRC Connection Release message may be important. Accordingly, wireless communication system 200 may support mechanisms for indicating an RRC Connection Release "complete" from UE 210, e.g., a connection release acknowledgment message, responsive to the connection release message. In a first option, the connection release acknowledgment message may include a L2/L3 ACK from UE 210 followed by a waiting period (e.g., a time period), e.g., to ensure that base station 205 doesn't ask for a retransmission. In some aspects, this procedure (L2/L3 ACK and/or waiting period) may be used if the RRC connection release includes information pertaining to Msg1 resources for grant-free data (e.g., the set of resources). Otherwise, UE 210 may follow legacy procedures. In some aspects the L2/L3 ACK from UE 210 may be configurable. For example, base station 205 may explicitly ask for the connection release acknowledgment message to be sent/not sent in some instances. In a second option, base station 205 may transmit a radio link control (RLC) polling bit along with the RLC packet carrying the RRC connection release message. In some aspects, the first option and the second option may be employed separately or together, e.g., they are not mutually exclusive of each other.

In some aspects, wireless communication system 200 may be configured to support UE assistance information, e.g., for UE 210 to provide traffic info, CE level etc., to base station 205. In a first option, this may include a procedure that UE 210 can initiate to request additional resources. In the request for additional resources, UE 210 may include or otherwise convey an indication of traffic information data (e.g., traffic level indicator). In some aspects, this request may be sent in one of the Msg1data resources (e.g., an grant-free uplink transmission using the set of resources) assigned to UE 210 as well. In some aspects, the request for additional resources and/or traffic level indicator may be transmitted while the UE 210 is operating in the connected state and/or based at least in part on the UE capability signal. In a second option, this may include information regarding the traffic needs being signaled in UE capability signaling. In some aspects, the traffic related information (e.g., traffic level indicator) may include one or more of the following: traffic periodicity (or traffic arrival pattern); traffic probability (e.g., if UE 210 will always transmit or sometimes will not have data for transmission); a delay tolerance; a packet size, and the like.

Accordingly, the configured resource set may include time/frequency resources for UE 210 to use for the grantless or grant-free uplink transmissions while operating in the disconnected state. In some aspects, the configured resource set may be used by the UEs (such as UE 210) for transmitting reference signals (e.g., DMRS) as well as data. In some aspects, the configured resource set may be based on, or otherwise associated with, an identifier of the reference signals. For example, each reference signal (e.g., DMRS) may have an associated index (e.g., DMRS sequence) that UE 210 selects when using the configured resource set. Each DMRS sequence in a configured resource set may be associated with a certain comb (e.g., selection of channels within a bandwidth), with an orthogonal cover code (OCC), with a frequency or cyclic shift, with a Zadoff-Chu root, and the like. In selecting a particular reference signal identifier (e.g., DMRS sequence), UE 210 may automatically use resources linked or otherwise associated with the reference signal identifier to transmit data signals (e.g., the grant-free uplink transmissions). As this link is configured, a base station (such as base station 205) receiving DMRSs from UE 210 automatically knows that UE 210 is performing an grant-free uplink transmission on the configured resource set. Accordingly, base station 205 may use the reference signals to determine the channel conditions, and then use the channel conditions to detect and decode the associated data signals.

In some aspects, wireless communication system 200 may be configured to support a release of the configured set of resources. In some aspects, the configured set of resources may be released based on a handover procedure where UE 210 performs a handover from base station 205 to a neighboring base station (not shown). In some aspects, the configured set of resources may be released after the expiration of the time period in which the resources are not used. In some aspects, the configured set of resources may be released based at least in part on one or more conditions identified by UE 210 (e.g., excessive clock drift, and out-of-synchronization condition, and the like).

In some aspects, resource release may typically occur or otherwise be based on when UE 210 moves out of the current serving cell (e.g., out of the coverage area of base station 205). For "SIB-only" resources (e.g., shared, contention-based), no resource release mechanism may be needed, in some examples.

When RRC signaling is used to release the configured set of resources (contention-free), several options may be available. In a first option, a new higher layer message from UE 210 may be used to explicitly signal or otherwise inform base station 205 of a cell change. For example, this is to be performed upon cell reselection by UE 210. To avoid "ping-pong" (back and forth reselections between cells) during reselection, a "prohibit timer" may be used. For example, UE 210 may start a timer after each cell reselection, and may not reselect to an old cell (e.g., base station 205) while the timer it is running (e.g., during a time period). In some aspects, the timer may be configurable, e.g., configured by a network entity, base station 205, and/or may be preconfigured for UE 210.

In some aspects, this may include establishing a "connection" explicitly for this purpose. One alternative to this technique may be to transmit this information the next time a connection is established (for e.g., Mobile Originated data). This may be handled by network implementation. For example, the connection may be established with a second base station, and then the second base station may forward this message (e.g. through MME or through X2) to the source base station (e.g., base station 205), which can release the configured set of resources.

In a second option for resource release, the resource release may include provisioning of an idle mode "release/keep-alive" message from UE 210. This may typically be a small transport block size (TB S) (e.g., 1 bit) discontinuous transmission (DTX) message from UE 210 at specified intervals. Base station 205 may monitor for this message and determine whether UE 210 is still alive or has released the resources. For example, transmission of this signal may signal "Msg1 resource release," whereas no transmission may signal "keep alive." In some aspects, UE 210 power saving may be achieved by not transmitting the signal during UE 210 keep alive. In another example, the transmission of the message may be considered as a "keep-alive" beacon, whereas no transmission for N>1consecutive occasions may signal "Msg1 resource release." In some aspects, using N>1 may avoid missed keep-alive transmissions from UE 210. In some aspects, this UE 210 message may also be extended to carry more than 1 bit of information, e.g., this message from UE 210 may be used to indicate a UE coverage level change, narrowband change, carrier change, etc.

In some aspects, transmission of the release/keep alive message may be sent according to two options. In a first option, some of the UEs assigned Msg1 resources may use a possibly separate "format" with a small TBS. This may need facilitating/transmitting control-plane data in addition to user-place data in the grant-free Msg1 uplink resources (e.g., the configured set of resources). In a second option, a new idle-mode "control channel" that is assigned to UEs to explicitly report on Msg1 resources may be used. Such channels may, in some examples, also carry some UE assistance information, e.g., a request for additional resources and/or traffic level indicator.

In a third option for resource release, this may be similar to option two, but may use or otherwise be based on a counter/timer (e.g., time period). For example, if UE 210 does not use the resources for N times/T seconds (N/T can be fixed and/or configured by base station 205 or another network entity), then the base station 205 may release the configured set of resources. From a UE perspective, this can be seen as "if UE 210 does not receive ACK for grant-free data . . . " or "if UE 210 does not complete the grant-free data procedure . . . " during N times or within T seconds. In some aspects, UE 210 may have resources that it will not use due to UE 210 having no data for transmission. To avoid release of Msg1 resources, UE 210 may periodically transmit a dummy payload (padding) to let base station 205 know that it is still using those resources. This dummy payload may be a separate "format" in the Msg1 data configurations, with its own TBS, etc.

In some aspects, the resource release may be based on access control. For example, there may be a lot of higher priority UEs 210 in the cell, and the base station 205 may want to not use the already reserved (assigned) resources for some UEs 210. This may be supported according to various options. In a first option, access class barring (ACB) for grant-free Msg1 data may be supported. This indication may be separate from legacy ACB. This may include assigning "relevant" classes to UEs 210 depending on cases when such release mechanisms may be needed. This mechanism may bar different UEs 210 belonging to different traffic priority classes/coverage enhancement from using grant-free resources.

In a second option, the set of resources may be released in a UE/UE group-specific manner. As one example, upon RRC connection of the UE 210 (or after transmission of EDT/Msg1 grant-free), the base station 205 may indicate release of Msg1 resources. In another example, base station 205 may use base station initiated paging to indicate the release of Msg1 resources. The paging message may be extended to include a new "cause," e.g., a "release Msg1/EDT resource" cause. The paging may be "UE group specific"—in this case, the new paging message may release Msg1 resources for that group of UEs. The paging may use a new paging message handling procedure. For example, the paging message may not trigger PRACH, since UE 210 already has valid TA. In some aspects, the paging record at UE 210 may need to be updated to reflect the necessary paging "cause." Additionally and optionally, for confirmation, UE 210 may use the Msg1 resource for the last time before release.

In some aspects, the resource release may be a one-time release that is based at least in part on UE 210 waking up early, e.g., UE 210 waking up before the scheduled set of resources. For example, in the situation where the clock drift of UE 210 causes it to acquire synchronization significantly in advance of the Msg1 data resource, UE 210 may move to EDT/PRACH and release the Msg1 data resource for that instance. In some aspects, this may be more power efficient than UE 210 staying awake until the Msg1 data resource occurs. This release can be explicit (e.g., UE 210 transmitting an indication of "I don't need that resource") or implicit (e.g., if UE 210 initiates a connection T seconds before the resource, then the resource is automatically released).

In some aspects, the resource release and/or configured set of resources may be associated with various access functions, e.g., handover, cell reselection, and the like. For example, the configured set of resources may generally be considered single-cell only (e.g., if UE 210 moves around, it loses its TA). Accordingly, it may be beneficial for UE 210 to stay within the coverage area as long as possible in the cell in which it has resources (e.g., within the coverage area base station 205). Accordingly, in some aspects, cell reselection may take into account the fact that UE 210 has the configured set of resources with base station 205. For example, when evaluating the S criteria, or ranking for cell reselection, the cell in which UE 210 has a valid TA and/or valid resources may be given an additional offset. As one non-limiting example, legacy UEs use the following equations for cell reselection:

$$R_s = X_{meas,s} + Q_{Hyst} - Q\text{offset}_{temp} + Q\text{offset}_{SCPTM}$$

$$R_n = Q_{meas,n} - Q\text{offset} - Q\text{offset}_{temp} + Q\text{offset}_{SCPTM}$$

In some aspects, an additional offset Q_grantFree variable may be added to the serving cell ranking R_s (e.g., the ranking for base station 205) if UE 210 has resources in that serving cell. The value of Q_grantFree may be fixed (e.g., preconfigured), signaled in a SIB message, or signaled to UE 210 when UE 210 is assigned the resources.

Additionally or alternatively, aspects of the described techniques may be utilized to allow base station 205 to transition UE 210 back to the connected state. For example, owing to the fact that UE 210 (which is capable of performing uplink Msg1 data transmissions in grant-free resources, e.g., performing grant-free uplink transmissions using the set of resources) has a valid TA, in addition to resource management and resource release via the procedures described above, during the course of Msg1 data-related communications (including RRC negotiations), base station 205 may (via RRC) directly send UE 210 to the connected state, by skipping PRACH. In some aspects, this may essentially be an "RRC Connection Setup" that may be signaled as part of the Msg1 negotiation and communication process. This RRC Connection Setup can be received as a response to Msg1 data (alternatively, RRC Connection Release may be received if base station 205 only wants to acknowledge the transmitted data).

Figure 3:
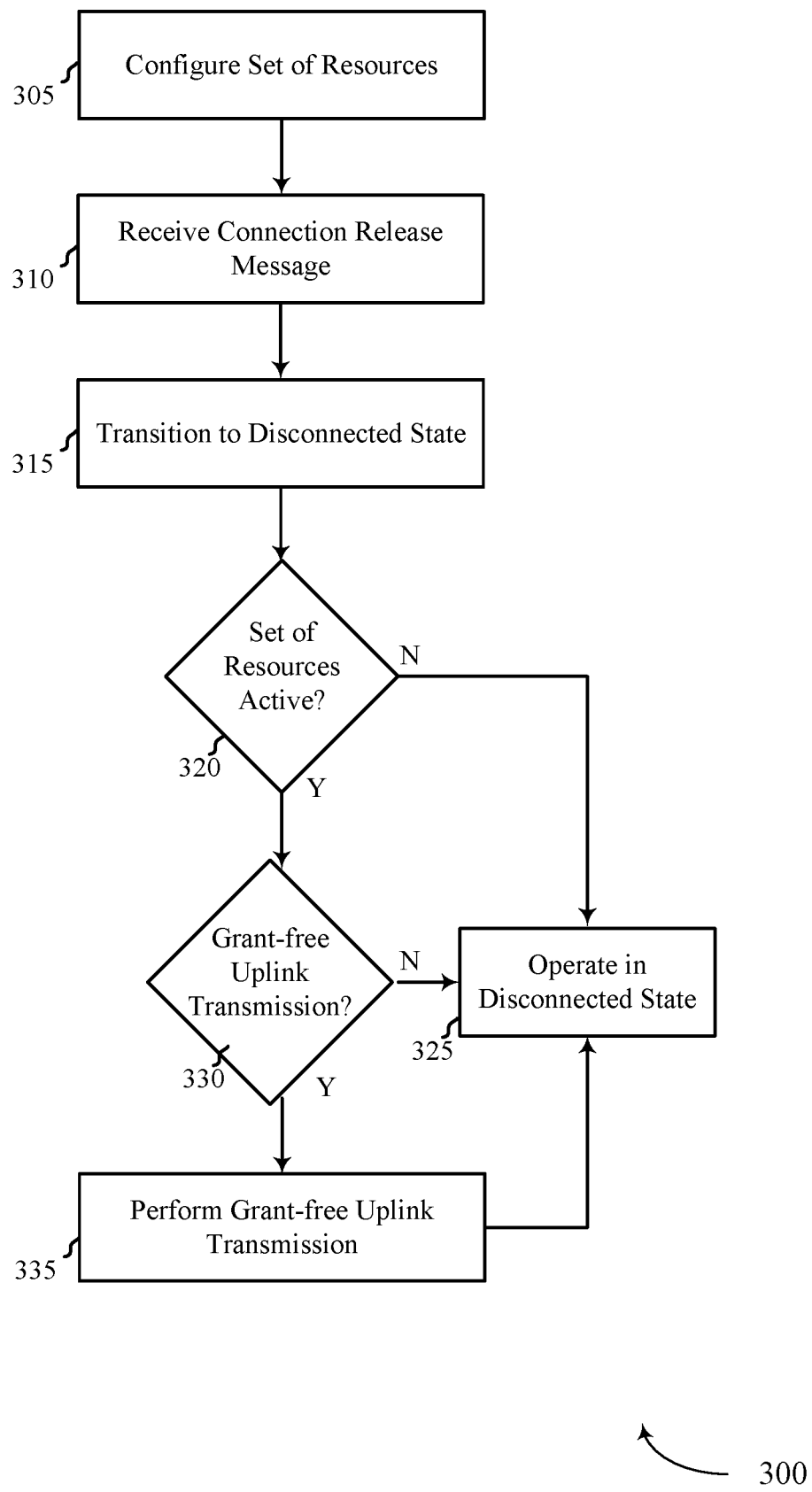
FIG. 3 illustrates an example of a method that supports resource management, access control and mobility for grant-free uplink transmission in accordance with aspects of the present disclosure.

FIG. 3 illustrates an example of a method 300 that supports resource management, access control and mobility for grant-free uplink transmission in accordance with aspects of the present disclosure. In some examples, method 300 may implement aspects of wireless communication systems 100/200. Aspects of method 300 may be implemented by a base station and/or UE, which may be examples of corresponding devices described herein.

At 305, a set of resources may be configured for the UE to use for performing grant-free uplink transmissions while the UE is operating in a disconnected state (e.g., in RRC idle or inactive state). In some aspects, the set of resources may be configured using one or more RRC messages, a MAC CE, or a higher layer signaling message. In some aspects, the set of resources may be configured while the UE is operating in a connected state (e.g., in an RRC connected state) and/or may be configured upon release from the connected state.

In some aspects, the set of resources may include one or more time and/or frequency resources for the UE to use for performing the grant-free uplink transmissions. In some aspects, the set of resources may include one or more DMRS resources (e.g., DMRS sequences and corresponding data resources, such as PUSCH resources).

At 310, the base station may transmit (and the UE may receive) a connection release message that generally triggers the UE to transition from the connected state to the disconnected state. In some aspects, the connection release message may include an RRC connection release message. In some aspects, the connection release message may carry or otherwise convey (explicitly and/or implicitly) a resource indicator that indicates or otherwise identifies whether the set of resources are to be used for the grant-free uplink transmissions by the UE while operating in the disconnected state. For example, the resource indicator may include a bit, flag, field, parameter, and the like, which signals that the resources are either available for use for grant-free uplink transmissions or are released (e.g., that the set of resources are de-configured). Accordingly, the UE may use the resource indicator to either confirm that the set of resources are available for use or release the set of resources.

As discussed above, in some examples of the set of resources may be configured upon release of the connected state. For example, the resource indicator carried or otherwise conveyed in the connection release message may identify (e.g., configure) the set of resources for the UE to use to perform grant-free uplink transmissions while operating in the disconnected state. For example, the resource indicator may carry or otherwise convey an indication of an identifier, an index, and the like, associated with the set of resources. The UE may use the identifier/index to determine which resources are to be used for grant-free uplink transmissions. In some aspects, the resource indicator identifying the set of resources may implicitly and/or explicitly convey the indication of whether or not the resources are available for use.

In some aspects, the resource indicator may be blank or otherwise empty to implicitly convey an indication of whether the set of resources are available for use. For example, the set of resources may be configured while the UE is operating in the connected state, where such configuration indicates that the resources are available. In this instance, the resource indicator may implicitly indicate whether the set of resources are available for use during the disconnected state. In one example, the resource indicator may be left blank to signal that the resources or available or that the resources are not available. Alternatively, the resource indicator may not be blank (e.g., may include information associated with the set of resources) to signal that the resources are available or that the resources are not available. The particular configuration and/or use of the resource indicator may be known by the base station and the UE, in order for each device to understand how the configured resource indicator is to be configured/interpreted.

The UE may optionally transmit a connection release acknowledgment message in response to the connection release message. The optional connection release acknowledgment message may provide an indication to the base station that the UE received the connection release message and/or was able to confirm the availability of a set of resources or release the set of resources. In some aspects, the base station may receive the connection release acknowledgment message and successfully decode the information contained in the connection release acknowledgment message. If the base station is unable to successfully decode the information, the base station may transmit a retransmission request message to the UE. The UE may initiate a timer and, if no retransmission request message is received during the time period associated with timer, the UE may consider that a successful acknowledgment and therefore transition to the disconnected state upon expiration of the timer.

Accordingly, at 315 the UE may transition to the disconnected state. At 320, the UE may determine whether the set of resources are active or otherwise available for use for performing grant-free uplink transmissions while the UE is operating in the disconnected state. For example, the UE may use the resource indicator carried or otherwise conveyed in the connection release message to determine whether or not the resources are available. If the resources are not available, at 325 the UE may continue to operate in the disconnected state until the UE transitions back to a connected state (e.g., due to mobile originated data being available for uplink transmission, due to receiving a transition request message from the base station, and the like).

If the set of resources are available or otherwise active for use, at 330 the UE may determine whether there is a need for to perform an grant-free uplink transmission. For example, the UE may determine whether it has uplink data to transmit to the base station and/or whether the UE needs to perform UE assistance transmissions (e.g., request additional resources and/or provide feedback information related to the current traffic levels, channel conditions, etc.). When there are no grant-free uplink transmissions to perform, the UE may continue to operate in the disconnected state at 325 until the UE transitions back to the connected state.

If there are grant-free uplink transmissions to perform while the UE is operating in the disconnected state, at 335 the UE may perform the grant-free uplink transmissions to the base station. In some aspects, the grant-free uplink transmissions may be performed using the set of resources. In some aspects, the grant-free uplink transmission may include uplink data transmissions, a request for additional resources, the traffic level indicator, a Msg1 transmission for an access procedure, and the like.

Figure 4:
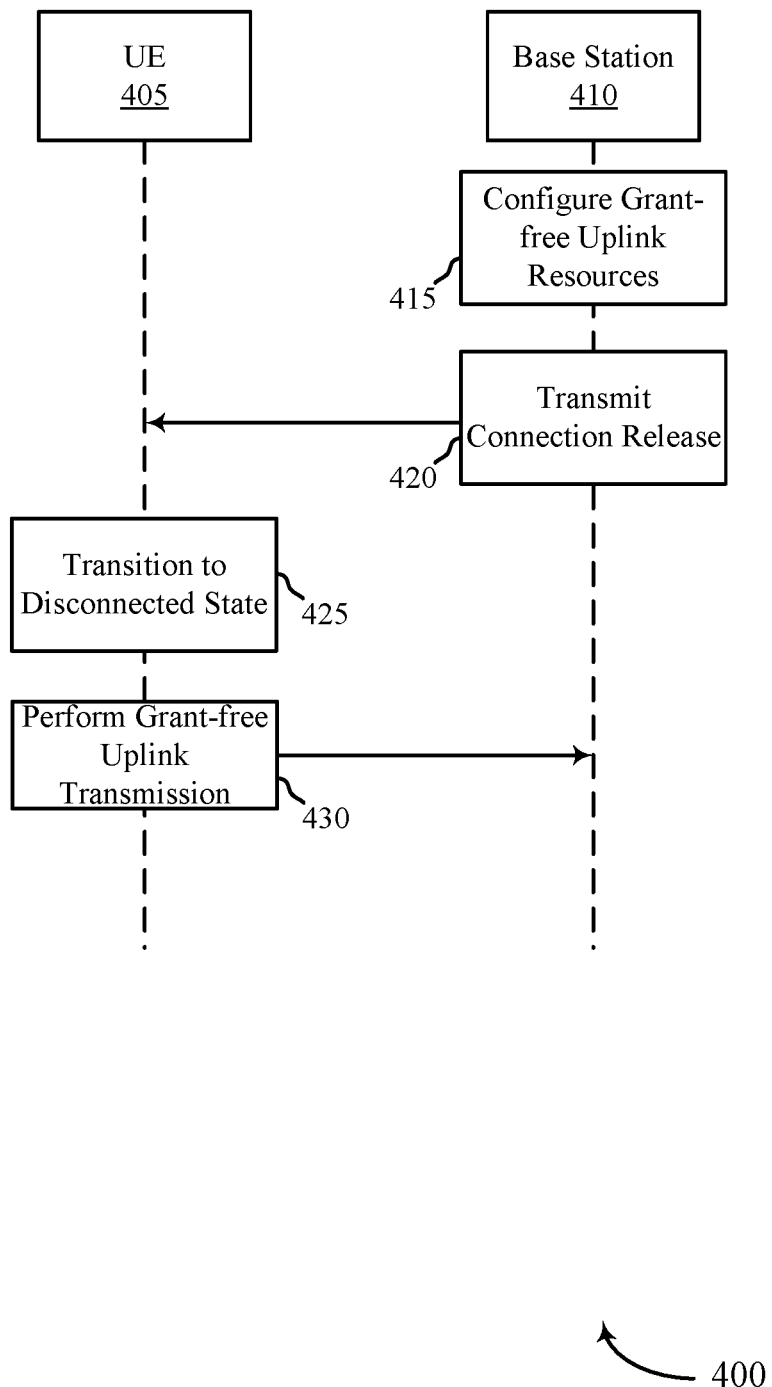
FIG. 4 illustrates an example of a process that supports resource management, access control and mobility for grant-free uplink transmission in accordance with aspects of the present disclosure.

FIG. 4 illustrates an example of a process 400 that supports resource management, access control and mobility for grant-free uplink transmission in accordance with aspects of the present disclosure. In some examples, process 400 may implement aspects of wireless communication systems 100/200 and/or method 300. Aspects of process 400 may be implement a by UE 405 and/or base station 410, which may be examples of corresponding devices described herein.

At 415, base station 410 may configure a set of resources for UE 405 to use for grant-free uplink transmissions while UE 405 is operating in the disconnected state. In some aspects, the set of resources may include a DMRS identifier and a corresponding DMRS resource (e.g., PUSCH resource) to use for the grant-free uplink transmissions. In some aspects, the DMRS identifier may include or otherwise refer to a DMRS sequence, a cyclic shift, a frequency domain comb pattern, an orthogonal cover code pattern spread across time, and/or a Zadoff-Chu root.

At 420, base station 410 may transmit (and UE 405 may receive) a connection release message. In some aspects, the connection release message may carry or otherwise convey an indication of a resource indicator that indicates or otherwise signals whether the set of resources are to be used for the grant-free uplink transmissions by UE 405 while operating in the disconnected state. For example, base station 410 may configure the resource indicator to implicitly and/or explicitly indicate information associated with a set of resources. That is, the resource indicator may implicitly and/or explicitly be configured to allow UE 405 to either confirm that the set of resources are available for use or to release the set of resources.

In some aspects, the resource indicator may be used to configure the set of resources. For example, the resource indicator may identify (e.g., configure) the set of resources for UE 405 to use to perform the grant-free uplink transmissions.

At 425, UE 405 may transition from a connected state to a disconnected state based at least in part on the connection release message. In some aspects, the connected state may include an RRC connected or active state, whereas the disconnected state may include an RRC idle state and/or an RRC inactive state.

At 430, UE 405 may perform grant-free uplink transmissions using the set of resources while operating in the disconnected state. In some aspects, the grant-free uplink transmissions may include uplink data transmissions, a request for additional resources, the traffic level indication, a channel performance metric, a Msg1 transmission, and the like.

In some aspects, the base station 410 may transmit (not shown) one or more messages to UE 405 that the releases (e.g., de-configures) the set of resources and/or reconfigures one or more of the parameters associated with a set of resources. For example, base station 410 may transmit a message that releases the set of resources using ACB, paging, cell reselection, and the like, with respect to UE 405. In some aspects, the base station 410 may transmit (now shown) one or more messages to UE 405 that reconfigures (e.g., adjusts) one or more parameters of the set of resources.

Figure 5:
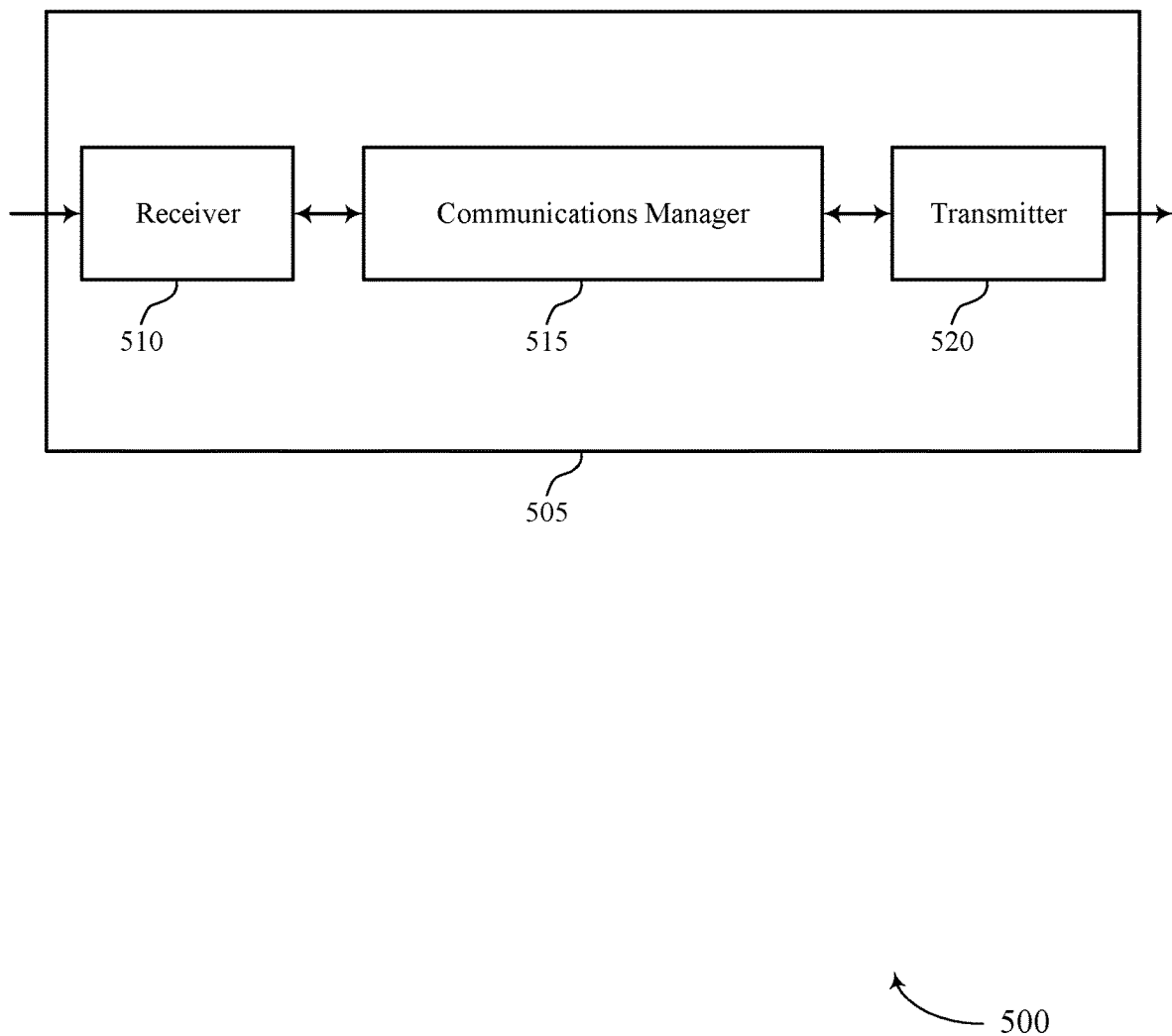
FIGS. 5 and 6 show block diagrams of devices that support resource management, access control and mobility for grant-free uplink transmission in accordance with aspects of the present disclosure.

FIG. 5 shows a block diagram 500 of a device 505 that supports resource management, access control and mobility for grant-free uplink transmission in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to resource management, access control and mobility for grant-free uplink transmission, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a connection release message, the connection release message including a resource indicator indicating that a set of resources are to be used for grant-free uplink transmissions by the UE while operating in a disconnected state, transition from a connected state to a disconnected state based on the connection release message, and perform, while operating in the disconnected state, the grant-free uplink transmissions using the set of resources. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
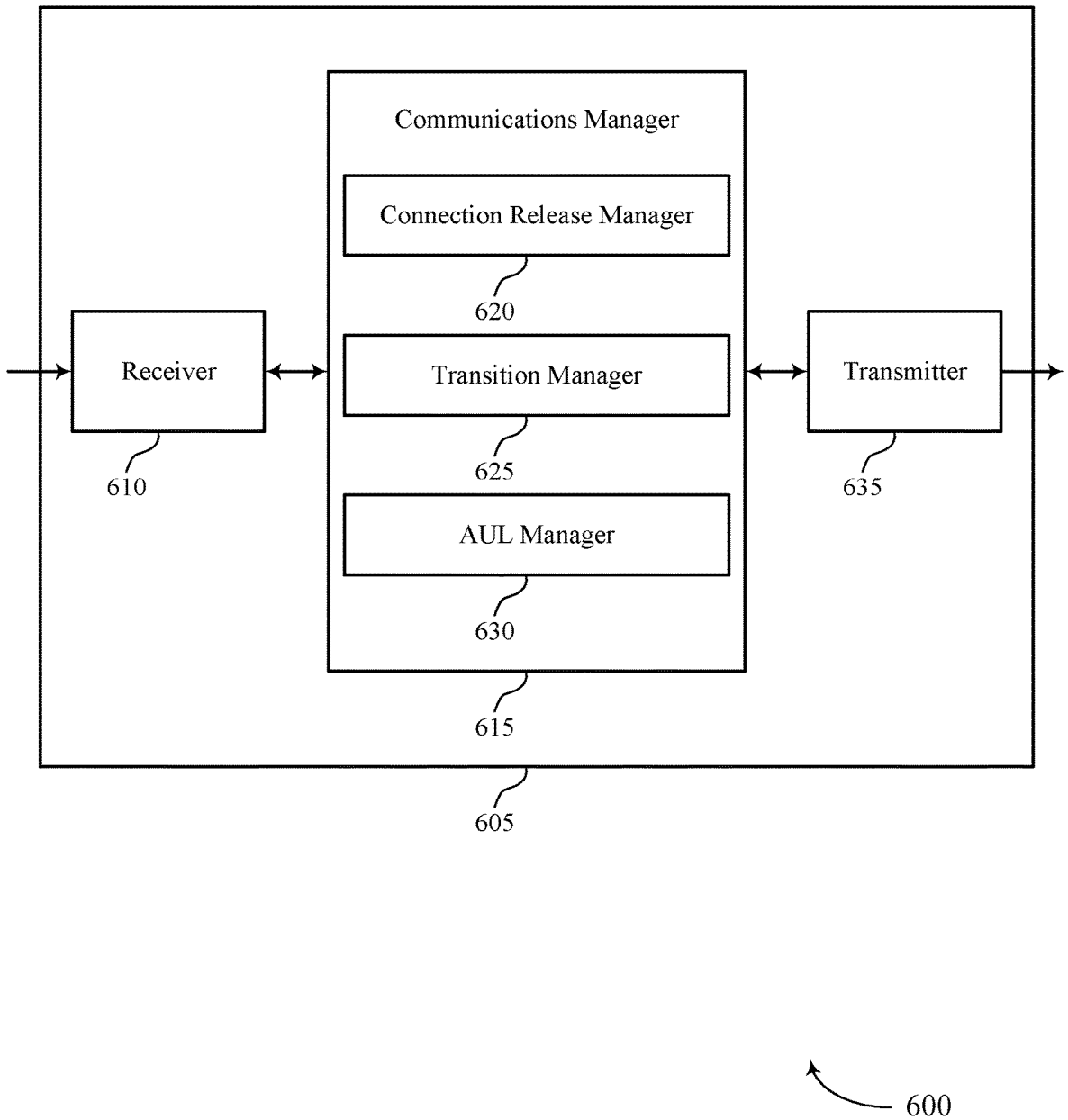

FIG. 6 shows a block diagram 600 of a device 605 that supports resource management, access control and mobility for grant-free uplink transmission in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to resource management, access control and mobility for grant-free uplink transmission, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a connection release manager 620, a transition manager 625, and an AUL manager 630. The communications manager 615 may be an example of aspects of the communications manager 810 described herein.

The connection release manager 620 may receive a connection release message, the connection release message including a resource indicator indicating that a set of resources are to be used for grant-free uplink transmissions by the UE while operating in a disconnected state.

The transition manager 625 may transition from a connected state to a disconnected state based on the connection release message.

The AUL manager 630 may perform, while operating in the disconnected state, the grant-free uplink transmissions using the set of resources.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
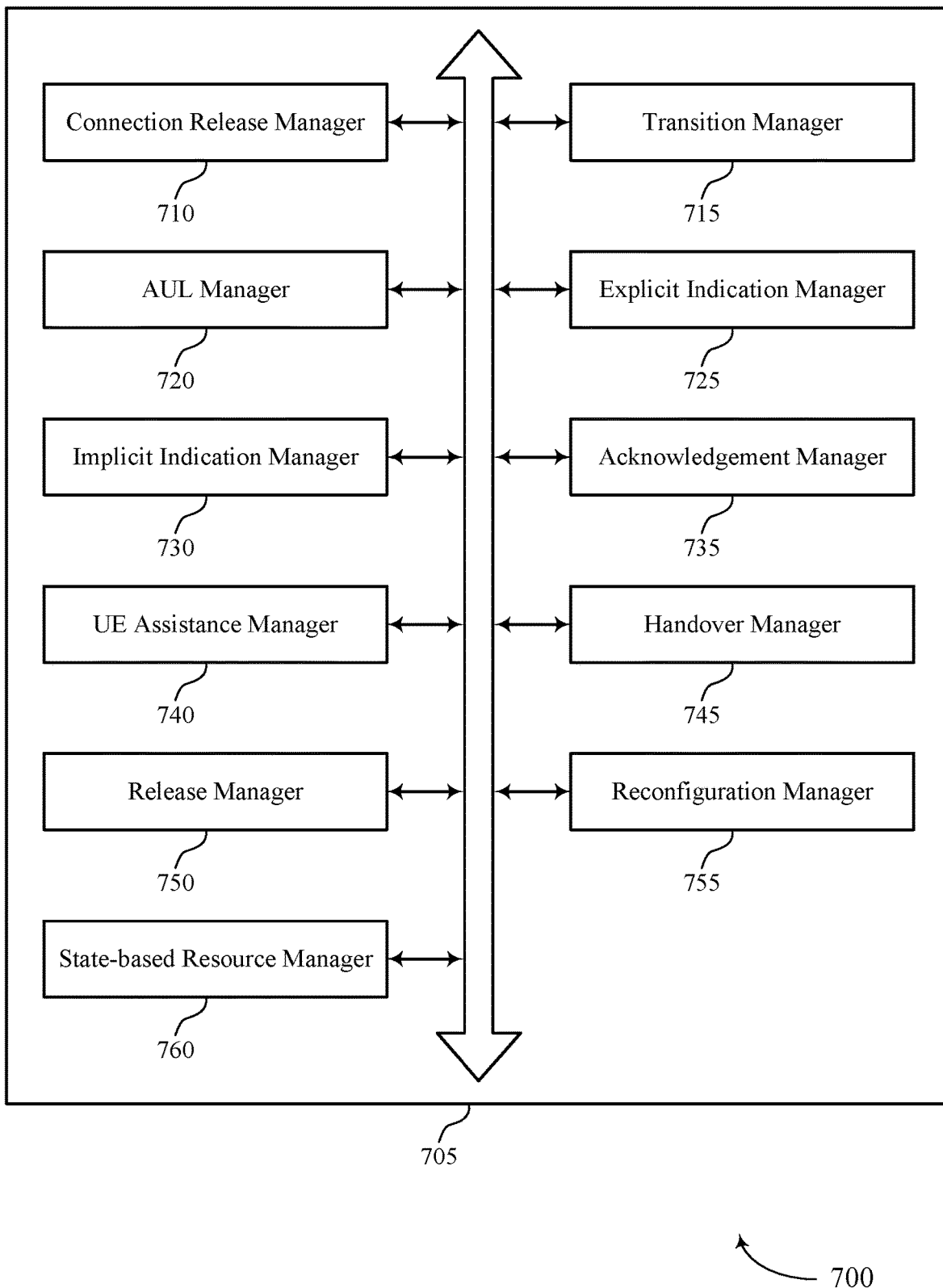
FIG. 7 shows a block diagram of a communications manager that supports resource management, access control and mobility for grant-free uplink transmission in accordance with aspects of the present disclosure.

FIG. 7 shows a block diagram 700 of a communications manager 705 that supports resource management, access control and mobility for grant-free uplink transmission in accordance with aspects of the present disclosure. The communications manager 705 may be an example of aspects of a communications manager 515, a communications manager 615, or a communications manager 810 described herein. The communications manager 705 may include a connection release manager 710, a transition manager 715, an AUL manager 720, an explicit indication manager 725, an implicit indication manager 730, an acknowledgement manager 735, an UE assistance manager 740, a handover manager 745, a release manager 750, a reconfiguration manager 755, and a state-based resource manager 760. Each of these modules may communicate, directly or indirectly, with one another (e.g., via one or more buses).

The connection release manager 710 may receive a connection release message, the connection release message including a resource indicator indicating that a set of resources are to be used for grant-free uplink transmissions by the UE while operating in a disconnected state.

In some cases, the set of resources include a DMRS identifier and corresponding DMRS resource to use for the grant-free uplink transmission, the DMRS identifier including at least one of a DMRS sequence, or a cyclic shift, or a frequency-domain comb pattern, or an orthogonal cover code pattern across time, or a Zadoff-Chu root, or a combination thereof.

In some cases, the connection release message includes the resource indicator identifying the set of resources.

The transition manager 715 may transition from a connected state to a disconnected state based on the connection release message. In some examples, the transition manager 715 may receive, from the base station, a transition request message. In some examples, the transition manager 715 may transition to the connected state based on the transition request message.

The AUL manager 720 may perform, while operating in the disconnected state, the grant-free uplink transmissions using the set of resources. In some cases, the grant-free uplink transmissions include a RACH Msg1 transmission.

The explicit indication manager 725 may determine that the resource indicator in the connection release message indicates information associated with the set of resources. In some examples, the explicit indication manager 725 may confirm, based on the determining, that the set of resources are available to use for grant-free uplink transmissions while operating in the disconnected state. In some examples, the explicit indication manager 725 may release, based on the determining, the set of resources to use for grant-free uplink transmissions while operating in the disconnected state.

The implicit indication manager 730 may determine that the resource indicator in the connection release message implicitly indicates information associated with the set of resources. In some examples, the implicit indication manager 730 may release, based on the determining, the set of resources to use for grant-free uplink transmissions while operating in the disconnected state. In some examples, the implicit indication manager 730 may confirm, based on the determining, that the set of resources are available to use for grant-free uplink transmissions while operating in the disconnected state.

The acknowledgement manager 735 may transmit a connection release acknowledgment message responsive to receiving the connection release message. In some examples, the acknowledgement manager 735 may determine that a retransmission request message was not received from the base station during a time period. In some examples, the acknowledgement manager 735 may transition to the disconnected state at an end of the time period based on the determining. In some cases, the time period includes at least one of a time period configured by a network entity, or a preconfigured time period, or a combination thereof.

The UE assistance manager 740 may transmit, while operating in the connected state, at least one of a request for additional resources, or a traffic level indicator, or a combination thereof. In some examples, the UE assistance manager 740 may transmit at least one of a request for additional resources, or a traffic level indicator, or a combination thereof, in a UE capability signal. In some cases, the grant-free uplink transmissions include at least one of a request for additional resources, or a traffic level indicator, or a combination thereof.

The handover manager 745 may perform a handover from the base station to a neighboring base station. In some examples, the handover manager 745 may transmit an indication that the set of resources are to be configured by the neighboring base station in response to the UE performing the handover. In some examples, the handover manager 745 may adjust a cell reselection parameter based on the set of resources being configured for use for grant-free uplink transmissions. In some cases, the indication is transmitted in a RRC message or in a disconnected state release/keep alive message.

The release manager 750 may determine that the set of resource are unused for a time period. In some examples, the release manager 750 may release the set of resources based on the determining. In some examples, the release manager 750 may receive a release message from the base station de-configuring the set of resources. In some examples, the release manager 750 may determine that a clock drift level has degraded below a threshold level. In some examples, the release manager 750 may release the set of resource based on the determining.

The reconfiguration manager 755 may receive a reconfiguration message from the base station reconfiguring one or more parameters associated with the set of resources.

The state-based resource manager 760 may receive, while the UE is operating in the connected state, a message configuring the set of resources to be used for grant-free uplink transmissions, where resource indicator identifies whether the set of resources are activated.

In some cases, the set of resources include a DMRS identifier and corresponding DMRS resource to use for the grant-free uplink transmission, the DMRS identifier including at least one of a DMRS sequence, or a cyclic shift, or a frequency-domain comb pattern, or an orthogonal cover code pattern across time, or a Zadoff-Chu root, or a combination thereof. In some cases, the message includes a radio resource control message.

Figure 8:
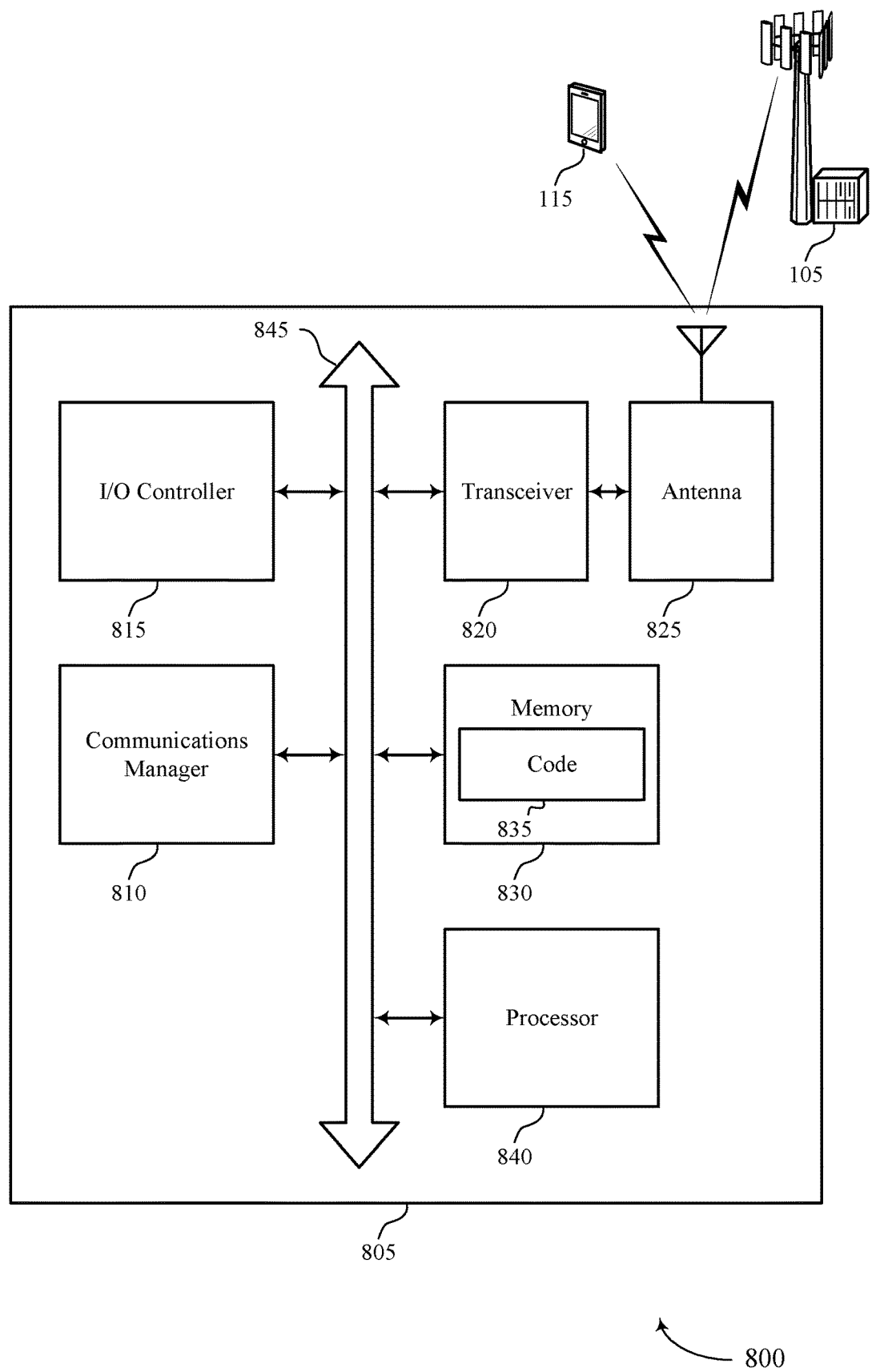
FIG. 8 shows a diagram of a system including a device that supports resource management, access control and mobility for grant-free uplink transmission in accordance with aspects of the present disclosure.

FIG. 8 shows a diagram of a system 800 including a device 805 that supports resource management, access control and mobility for grant-free uplink transmission in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a connection release message, the connection release message including a resource indicator indicating that a set of resources are to be used for grant-free uplink transmissions by the UE while operating in a disconnected state, transition from a connected state to a disconnected state based on the connection release message, and perform, while operating in the disconnected state, the grant-free uplink transmissions using the set of resources.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting resource management, access control and mobility for grant-free uplink transmission).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
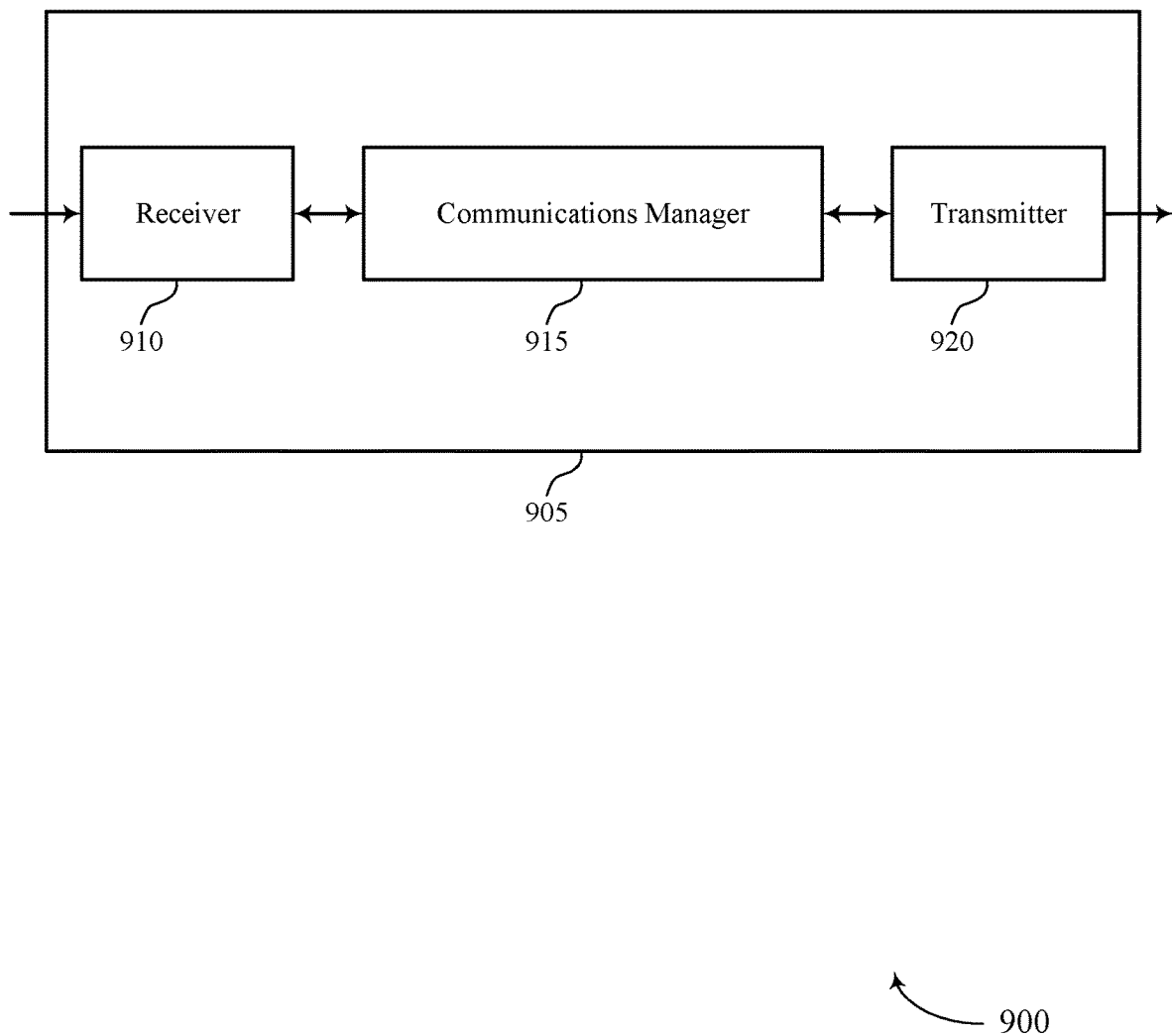
FIGS. 9 and 10 show block diagrams of devices that support resource management, access control and mobility for grant-free uplink transmission in accordance with aspects of the present disclosure.

FIG. 9 shows a block diagram 900 of a device 905 that supports resource management, access control and mobility for grant-free uplink transmission in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to resource management, access control and mobility for grant-free uplink transmission, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may configure a set of resources for a UE to use for grant-free uplink transmissions while the UE is operating in a disconnected state, transmit a connection release message that includes a resource indicator to the UE, the resource indicator indicating the set of resources configured for the UE, the connection release message transitioning the UE from a connected state to the disconnected state, and receive, while the UE is operating in the disconnected state, the grant-free uplink transmissions from the UE using the set of resources configured for the UE. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
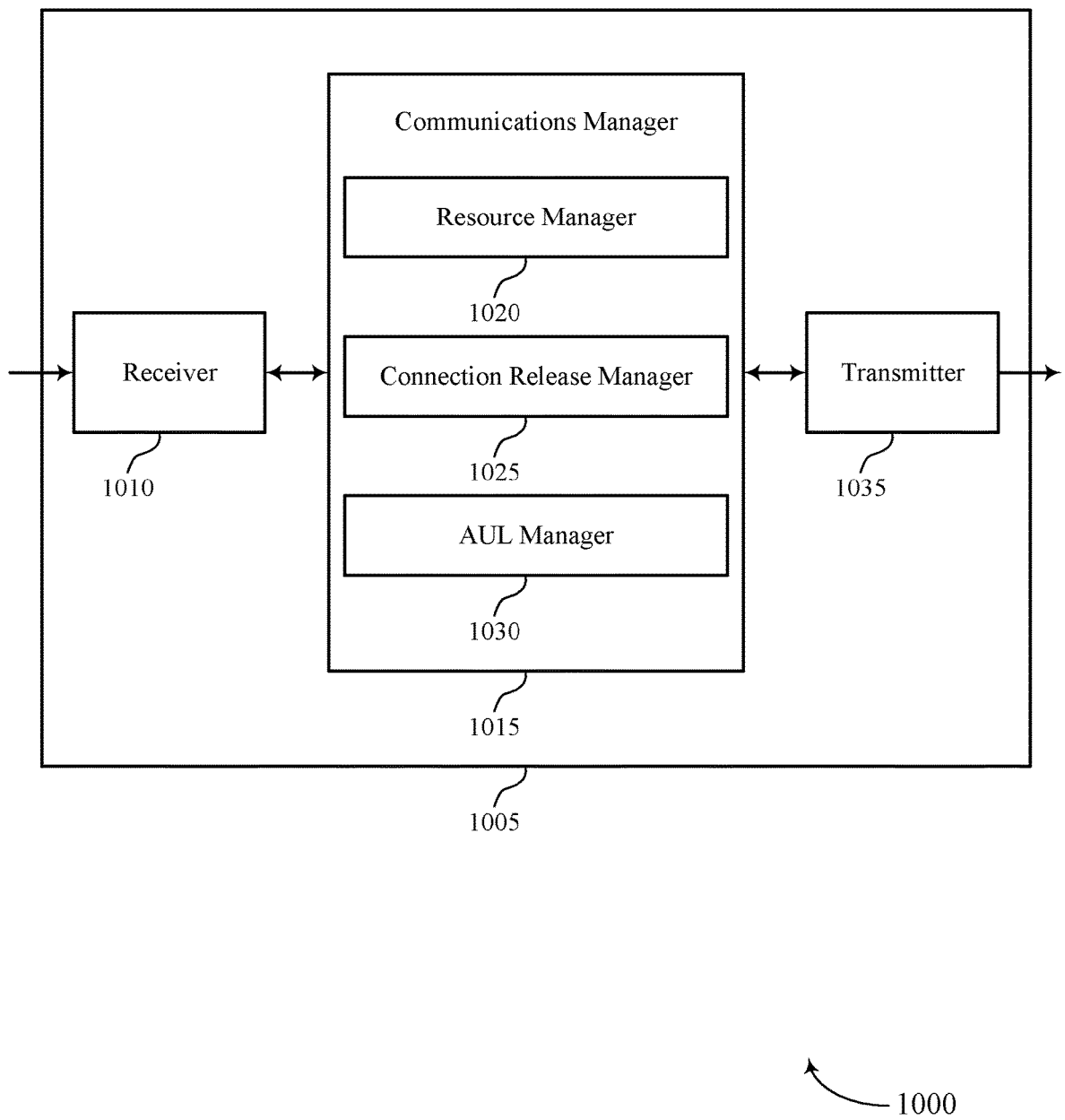

FIG. 10 shows a block diagram 1000 of a device 1005 that supports resource management, access control and mobility for grant-free uplink transmission in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to resource management, access control and mobility for grant-free uplink transmission, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a resource manager 1020, a connection release manager 1025, and an AUL manager 1030. The communications manager 1015 may be an example of aspects of the communications manager 1210 described herein.

The resource manager 1020 may configure a set of resources for a UE to use for grant-free uplink transmissions while the UE is operating in a disconnected state.

The connection release manager 1025 may transmit a connection release message that includes a resource indicator to the UE, the resource indicator indicating the set of resources configured for the UE, the connection release message transitioning the UE from a connected state to the disconnected state.

The AUL manager 1030 may receive, while the UE is operating in the disconnected state, the grant-free uplink transmissions from the UE using the set of resources configured for the UE.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
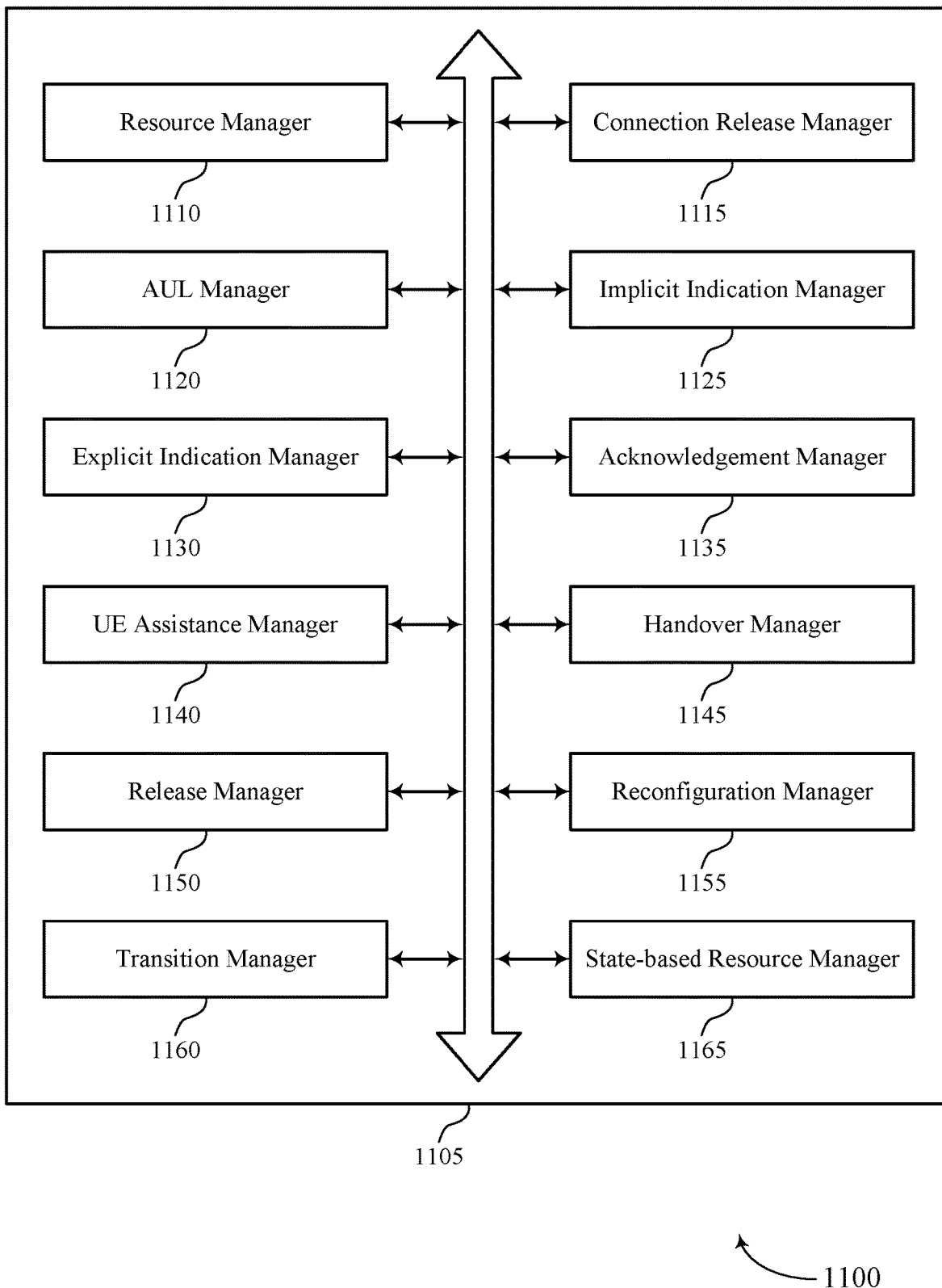
FIG. 11 shows a block diagram of a communications manager that supports resource management, access control and mobility for grant-free uplink transmission in accordance with aspects of the present disclosure.

FIG. 11 shows a block diagram 1100 of a communications manager 1105 that supports resource management, access control and mobility for grant-free uplink transmission in accordance with aspects of the present disclosure. The communications manager 1105 may be an example of aspects of a communications manager 915, a communications manager 1015, or a communications manager 1210 described herein. The communications manager 1105 may include a resource manager 1110, a connection release manager 1115, an AUL manager 1120, an implicit indication manager 1125, an explicit indication manager 1130, an acknowledgement manager 1135, an UE assistance manager 1140, a handover manager 1145, a release manager 1150, a reconfiguration manager 1155, a transition manager 1160, and a state-based resource manager 1165. Each of these modules may communicate, directly or indirectly, with one another (e.g., via one or more buses).

The resource manager 1110 may configure a set of resources for a UE to use for grant-free uplink transmissions while the UE is operating in a disconnected state.

The connection release manager 1115 may transmit a connection release message that includes a resource indicator to the UE, the resource indicator indicating the set of resources configured for the UE, the connection release message transitioning the UE from a connected state to the disconnected state. In some cases, the set of resources include a DMRS identifier and corresponding DMRS resource to use for the grant-free uplink transmission, the DMRS identifier including at least one of a DMRS sequence, or a cyclic shift, or a frequency-domain comb pattern, or an orthogonal cover code pattern across time, or a Zadoff-Chu root, or a combination thereof. In some cases, the connection release message includes the resource indicator identifying the set of resources.

The AUL manager 1120 may receive, while the UE is operating in the disconnected state, the grant-free uplink transmissions from the UE using the set of resources configured for the UE.

The implicit indication manager 1125 may configure the resource indicator in the connection release message to implicitly indicate information associated with the set of resources. In some examples, the implicit indication manager 1125 may release, based on the configuring, the set of resources. In some examples, the implicit indication manager 1125 may confirm, based on the configuring, that the set of resources are available to use for grant-free uplink transmissions while operating in the disconnected state.

The explicit indication manager 1130 may configure the resource indicator in the connection release message to indicate information associated with the set of resources. In some examples, the explicit indication manager 1130 may confirm, based on the configuring, that the set of resources are available to use for grant-free uplink transmissions while the UE is operating in the disconnected state. In some examples, the explicit indication manager 1130 may release, based on the configuring, the set of resources.

The acknowledgement manager 1135 may receive a connection release acknowledgment message responsive to transmitting the connection release message.

The UE assistance manager 1140 may receive, while the UE is operating in the connected state, at least one of a request for additional resources, or a traffic level indicator, or a combination thereof. In some examples, the UE assistance manager 1140 may receive at least one of a request for additional resources, or a traffic level indicator, or a combination thereof, in a UE capability signal. In some cases, the grant-free uplink transmissions includes at least one of a request for additional resources, a traffic level indicator, or a combination thereof.

The handover manager 1145 may determine that the UE has performed a handover from the base station to a neighboring base station. In some examples, the handover manager 1145 may transmit an indication that the set of resources are released in response to the UE performing the handover.

The release manager 1150 may determine that the set of resource are unused for a time period. In some examples, the release manager 1150 may release the set of resources based on the determining. In some examples, the release manager 1150 may transmit a release message to the UE de-configuring the set of resources. In some examples, the release manager 1150 may determine that the UE is associated with a defined access class, where the release message is transmitted based on the determining. In some examples, the release manager 1150 may determine that the UE has transitioned from the disconnected state to the connected state, where the release message is transmitted based on the determining. In some examples, determining that a paging message is to be transmitted to the UE, where the release message is transmitted based on the determining and the paging message includes the release message. For example, the paging message may carry or otherwise indicate a new paging "cause"

The reconfiguration manager 1155 may transmit a reconfiguration message to the UE reconfiguring one or more parameters associated with the set of resources.

The transition manager 1160 may transmit, to the UE, a transition request message.

The state-based resource manager 1165 may transmit, while the UE is operating in the connected state, a message configuring the set of resources to be used for grant-free uplink transmissions, where resource indicator identifies whether the set of resources are activated.

In some cases, the set of resources include a DMRS identifier and corresponding DMRS resource to use for the grant-free uplink transmission, the DMRS identifier including at least one of a DMRS sequence, or a cyclic shift, or a frequency-domain comb pattern, or an orthogonal cover code pattern across time, or a Zadoff-Chu root, or a combination thereof. In some cases, the message includes a radio resource control message.

Figure 12:
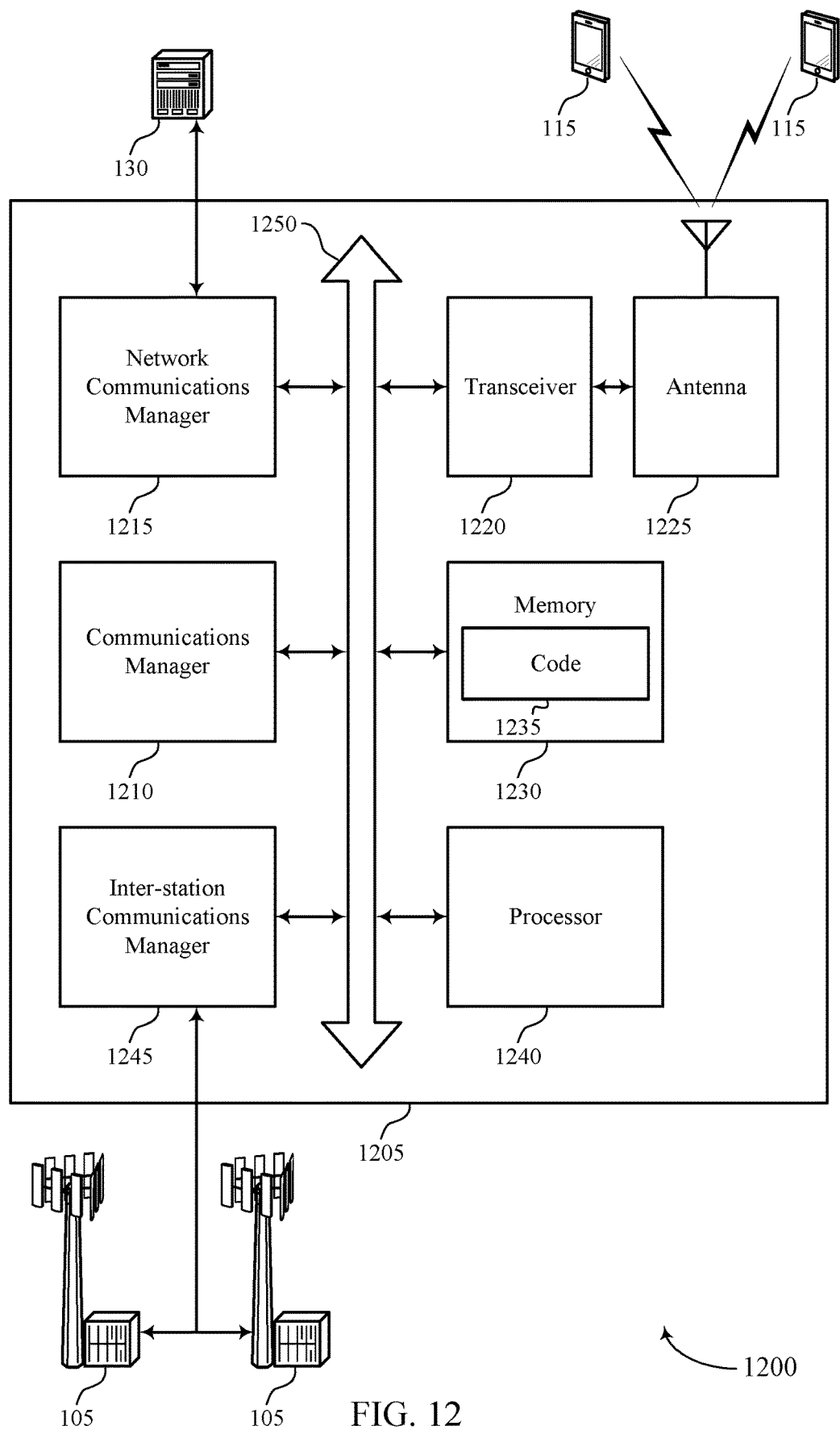
FIG. 12 shows a diagram of a system including a device that supports resource management, access control and mobility for grant-free uplink transmission in accordance with aspects of the present disclosure.

FIG. 12 shows a diagram of a system 1200 including a device 1205 that supports resource management, access control and mobility for grant-free uplink transmission in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may configure a set of resources for a UE to use for grant-free uplink transmissions while the UE is operating in a disconnected state, transmit a connection release message that includes a resource indicator to the UE, the resource indicator indicating the set of resources configured for the UE, the connection release message transitioning the UE from a connected state to the disconnected state, and receive, while the UE is operating in the disconnected state, the grant-free uplink transmissions from the UE using the set of resources configured for the UE.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting resource management, access control and mobility for grant-free uplink transmission).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
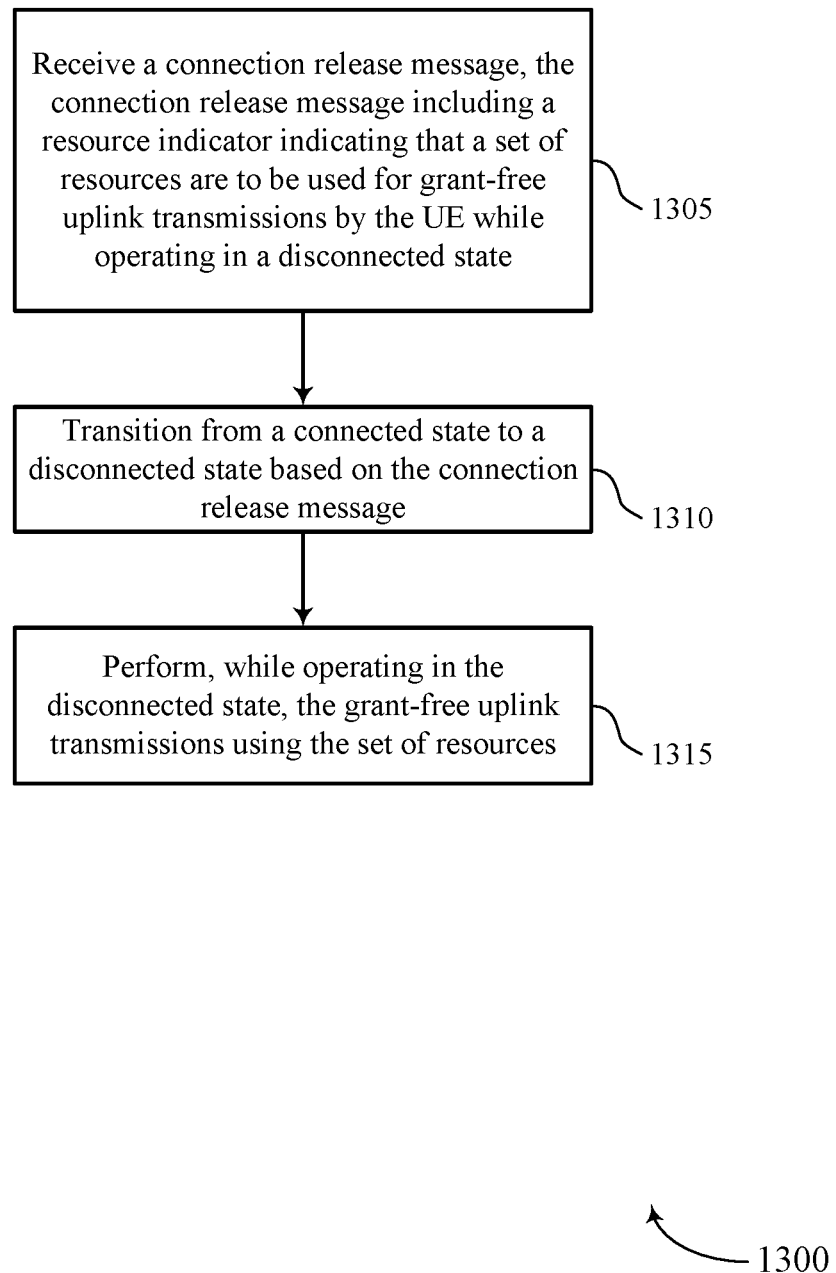
FIGS. 13 through 16 show flowcharts illustrating methods that support resource management, access control and mobility for grant-free uplink transmission in accordance with aspects of the present disclosure.

FIG. 13 shows a flowchart illustrating a method 1300 that supports resource management, access control and mobility for grant-free uplink transmission in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a connection release message, the connection release message including a resource indicator indicating that a set of resources are to be used for grant-free uplink transmissions by the UE while operating in a disconnected state. The operations of 1305 may be performed according to the methods described herein. In some examples, aspects of the operations of 1305 may be performed by a connection release manager as described with reference to FIGS. 5 through 8.

At 1310, the UE may transition from a connected state to a disconnected state based on the connection release message. The operations of 1310 may be performed according to the methods described herein. In some examples, aspects of the operations of 1310 may be performed by a transition manager as described with reference to FIGS. 5 through 8.

At 1315, the UE may perform, while operating in the disconnected state, the grant-free uplink transmissions using the set of resources. The operations of 1315 may be performed according to the methods described herein. In some examples, aspects of the operations of 1315 may be performed by an AUL manager as described with reference to FIGS. 5 through 8.

Figure 14:
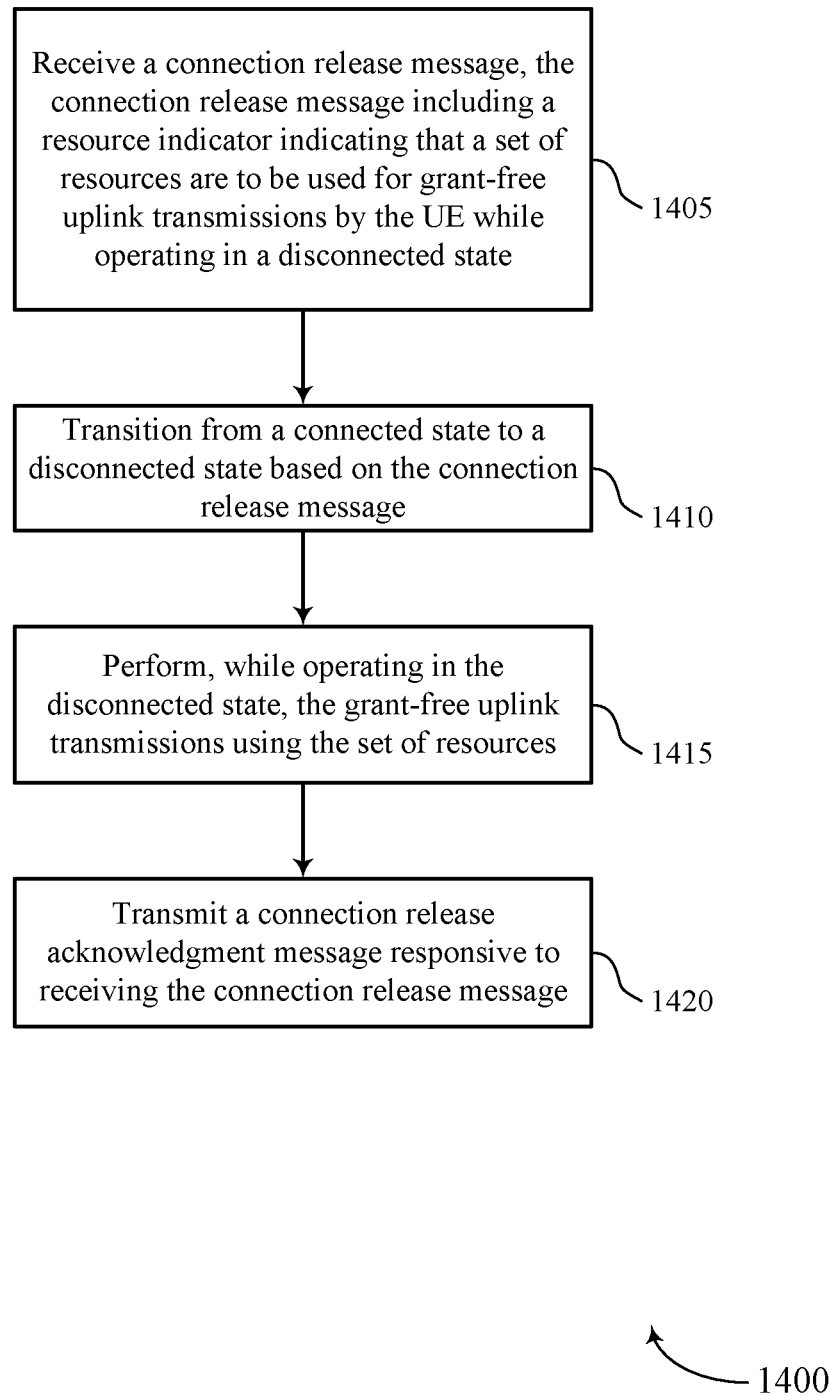

FIG. 14 shows a flowchart illustrating a method 1400 that supports resource management, access control and mobility for grant-free uplink transmission in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a connection release message, the connection release message including a resource indicator indicating that a set of resources are to be used for grant-free uplink transmissions by the UE while operating in a disconnected state. The operations of 1405 may be performed according to the methods described herein. In some examples, aspects of the operations of 1405 may be performed by a connection release manager as described with reference to FIGS. 5 through 8.

At 1410, the UE may transition from a connected state to a disconnected state based on the connection release message. The operations of 1410 may be performed according to the methods described herein. In some examples, aspects of the operations of 1410 may be performed by a transition manager as described with reference to FIGS. 5 through 8.

At 1415, the UE may perform, while operating in the disconnected state, the grant-free uplink transmissions using the set of resources. The operations of 1415 may be performed according to the methods described herein. In some examples, aspects of the operations of 1415 may be performed by an AUL manager as described with reference to FIGS. 5 through 8.

At 1420, the UE may transmit a connection release acknowledgment message responsive to receiving the connection release message. The operations of 1420 may be performed according to the methods described herein. In some examples, aspects of the operations of 1420 may be performed by an acknowledgement manager as described with reference to FIGS. 5 through 8.

Figure 15:
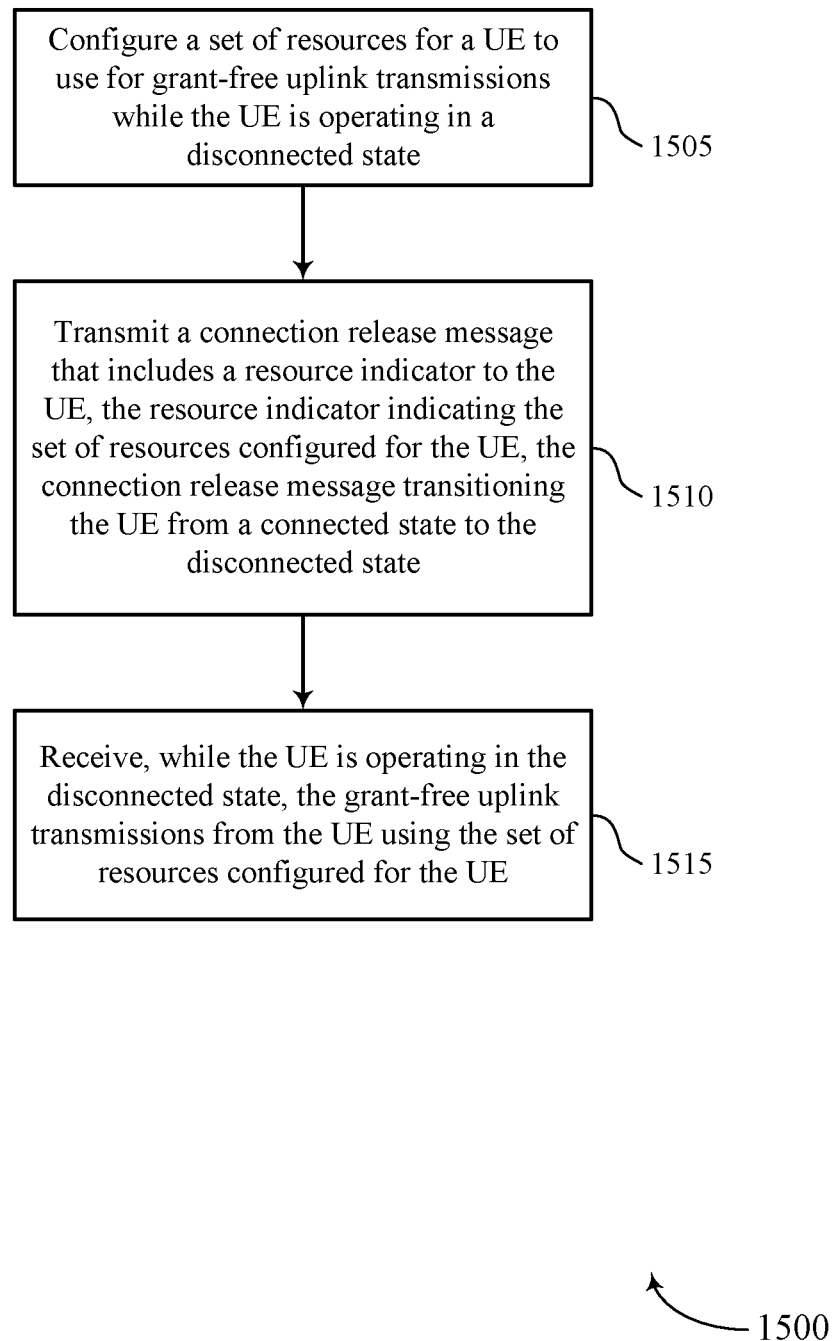

FIG. 15 shows a flowchart illustrating a method 1500 that supports resource management, access control and mobility for grant-free uplink transmission in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may configure a set of resources for a UE to use for grant-free uplink transmissions while the UE is operating in a disconnected state. The operations of 1505 may be performed according to the methods described herein. In some examples, aspects of the operations of 1505 may be performed by a resource manager as described with reference to FIGS. 9 through 12.

At 1510, the base station may transmit a connection release message that includes a resource indicator to the UE, the resource indicator indicating the set of resources configured for the UE, the connection release message transitioning the UE from a connected state to the disconnected state. The operations of 1510 may be performed according to the methods described herein. In some examples, aspects of the operations of 1510 may be performed by a connection release manager as described with reference to FIGS. 9 through 12.

At 1515, the base station may receive, while the UE is operating in the disconnected state, the grant-free uplink transmissions from the UE using the set of resources configured for the UE. The operations of 1515 may be performed according to the methods described herein. In some examples, aspects of the operations of 1515 may be performed by an AUL manager as described with reference to FIGS. 9 through 12.

Figure 16:
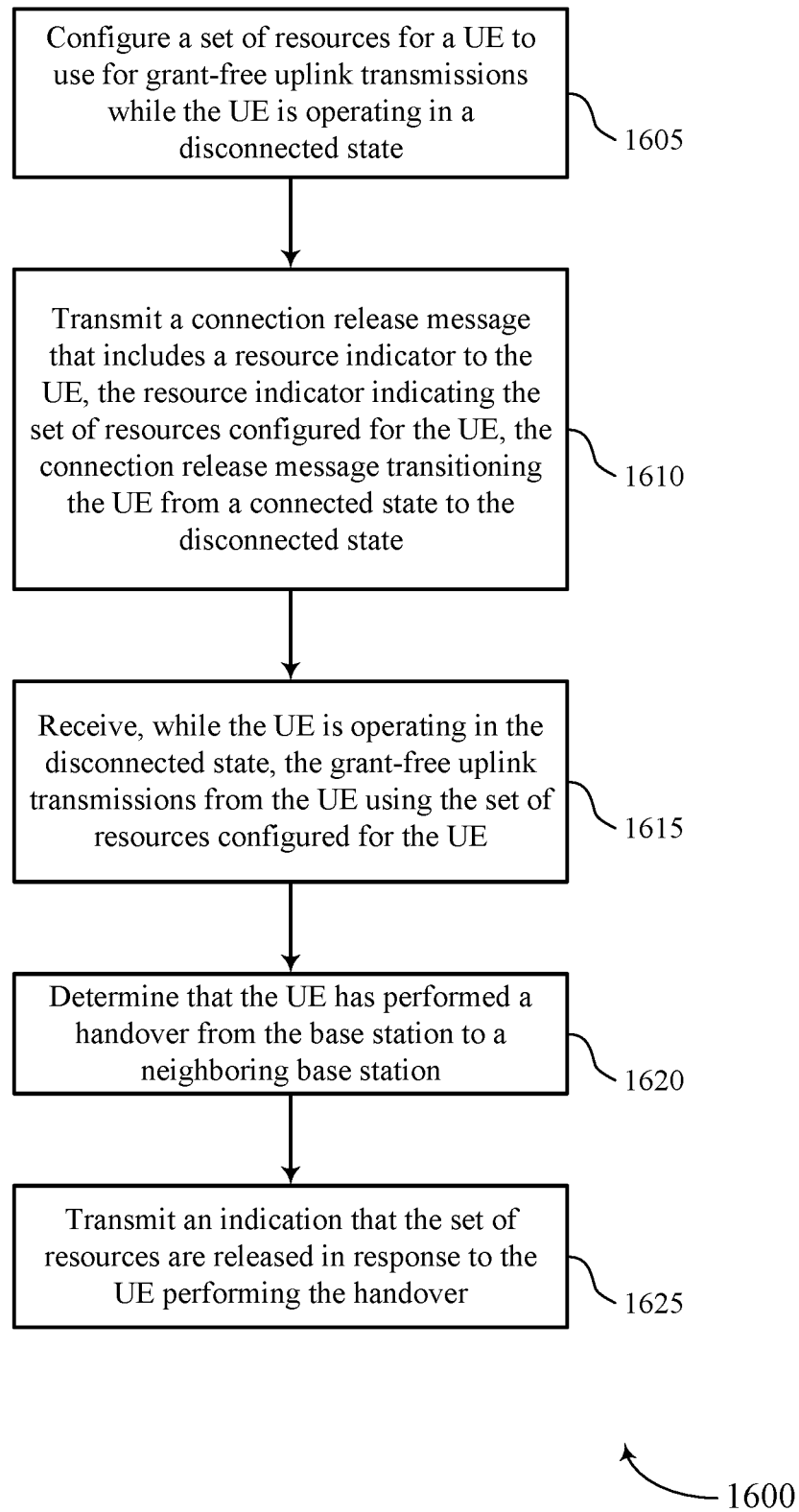

FIG. 16 shows a flowchart illustrating a method 1600 that supports resource management, access control and mobility for grant-free uplink transmission in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may configure a set of resources for a UE to use for grant-free uplink transmissions while the UE is operating in a disconnected state. The operations of 1605 may be performed according to the methods described herein. In some examples, aspects of the operations of 1605 may be performed by a resource manager as described with reference to FIGS. 9 through 12.

At 1610, the base station may transmit a connection release message that includes a resource indicator to the UE, the resource indicator indicating the set of resources configured for the UE, the connection release message transitioning the UE from a connected state to the disconnected state. The operations of 1610 may be performed according to the methods described herein. In some examples, aspects of the operations of 1610 may be performed by a connection release manager as described with reference to FIGS. 9 through 12.

At 1615, the base station may receive, while the UE is operating in the disconnected state, the grant-free uplink transmissions from the UE using the set of resources configured for the UE. The operations of 1615 may be performed according to the methods described herein. In some examples, aspects of the operations of 1615 may be performed by an AUL manager as described with reference to FIGS. 9 through 12.

At 1620, the base station may determine that the UE has performed a handover from the base station to a neighboring base station. The operations of 1620 may be performed according to the methods described herein. In some examples, aspects of the operations of 1620 may be performed by a handover manager as described with reference to FIGS. 9 through 12.

At 1625, the base station may transmit an indication that the set of resources are released in response to the UE performing the handover. The operations of 1625 may be performed according to the methods described herein. In some examples, aspects of the operations of 1625 may be performed by a handover manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving a connection release message, the connection release message including a resource indicator indicating that a set of resources are to be used for grant-free uplink transmissions by the UE while operating in a disconnected state;
    transitioning from a connected state to a disconnected state based at least in part on the connection release message;
    performing, while operating in the disconnected state, the grant-free uplink transmissions using the set of resources, wherein the set of resources are released upon one or more conditions satisfying a threshold; and
    determining that the set of resource are unused for a threshold number of transmission occasions, wherein the conditions satisfying the threshold comprises at least the set of resources being considered to have been released by the base station based at least in part on the determining.

2. The method of claim 1, further comprising:
    determining that the resource indicator in the connection release message indicates information associated with the set of resources.

3. The method of claim 2, further comprising:
    releasing, based at least in part on the determining, the set of resources to use for grant-free uplink transmissions while operating in the disconnected state.

4. The method of claim 1, further comprising:
    determining that the resource indicator in the connection release message implicitly indicates information associated with the set of resources.

5. The method of claim 4, further comprising:
    releasing, based at least in part on the determining, the set of resources to use for grant-free uplink transmissions while operating in the disconnected state.

6. The method of claim 1, further comprising:
    determining that the set of resource are unused for a time period, wherein the set of resources are considered to have been released by the base station based at least in part on the determining.

7. The method of claim 6, further comprising:
    receiving a signal from the base station configuring the time period.

8. The method of claim 1, further comprising:
    receiving a signal from the base station configuring the threshold number of transmission occasions.

9. The method of claim 1, further comprising:
    receiving a release message from the base station de-configuring the set of resources.

10. The method of claim 1, further comprising:
    determining that a clock drift level has degraded below a threshold level, wherein the set of resources are considered to have been released by the base station based at least in part on the determining.

11. The method of claim 1, further comprising:
    determining that no acknowledgement for the grant-free uplink transmission was receive from the base station, wherein the set of resources are considered to have been released by the base station based at least in part on the determining.

12. The method of claim 1, further comprising:
    determining that the UE has no data for transmission in the grant-free uplink transmission; and
    transmitting, based at least in part on the UE having no data for transmission, a dummy payload as the grant-free uplink transmission to preserve the set of resources.

13. A method for wireless communication at a base station, comprising:
    configuring a set of resources for a user equipment (UE) to use for grant-free uplink transmissions while the UE is operating in a disconnected state;
    transmitting a connection release message that includes a resource indicator to the UE, the resource indicator indicating the set of resources configured for the UE, the connection release message transitioning the UE from a connected state to the disconnected state;
    receiving, while the UE is operating in the disconnected state, the grant-free uplink transmissions from the UE using the set of resources configured for the UE, wherein the set of resources are released upon one or more conditions satisfying a threshold; and
    determining that the set of resource are unused for a threshold number of transmission occasions, wherein the conditions satisfying the threshold comprise at least the set of resources being considered to have been released based at least in part on the determining.

14. The method of claim 13, further comprising:
    configuring the resource indicator in the connection release message to implicitly indicate information associated with the set of resources.

15. The method of claim 14, further comprising:
    releasing, based at least in part on the configuring, the set of resources.

16. The method of claim 13, further comprising:
    configuring the resource indicator in the connection release message to indicate information associated with the set of resources.

17. The method of claim 16, further comprising:
    releasing, based at least in part on the configuring, the set of resources.

18. The method of claim 14, further comprising:
determining that the set of resource are unused for a time period; and
releasing the set of resources based at least in part on the determining.

19. The method of claim 18, further comprising:
transmitting a signal to the UE configuring the time period.

20. The method of claim 13, further comprising:
transmitting a signal to the UE configuring the threshold number of transmission occasions.

21. The method of claim 13, further comprising:
transmitting a release message to the UE de-configuring the set of resources.

22. The method of claim 21, further comprising:
determining that the UE is associated with a defined access class, wherein the release message is transmitted based at least in part on the determining.

23. The method of claim 22, wherein the defined access class comprises an grant-free uplink resource configured access class.

24. The method of claim 21, further comprising:
determining that the UE has transitioned from the disconnected state to the connected state, wherein the release message is transmitted based at least in part on the determining.

25. The method of claim 21, further comprising:
determining that a paging message is to be transmitted to the UE, wherein the release message is transmitted based at least in part on the determining and the paging message comprises the release message.

26. The method of claim 25, wherein the paging message comprises a resource release cause.

27. An apparatus for wireless communication at a user equipment (UE), comprising: a processor, memory coupled with the processor; and instructions stored in the memory and executable by the processor to cause the UE to:
receive a connection release message, the connection release message including a resource indicator indicating that a set of resources are to be used for grant-free uplink transmissions by the UE while operating in a disconnected state;
transition from a connected state to a disconnected state based at least in part on the connection release message;
perform, while operating in the disconnected state, the grant-free uplink transmissions using the set of resources, wherein the set of resources are released upon one or more conditions satisfying a threshold; and
determine that the set of resource are unused for a threshold number of transmission occasions, wherein the conditions satisfying the threshold comprises at least the set of resources being considered to have been released by the base station based at least in part on the determining.

28. The apparatus of claim 27, wherein the instructions are further executable by the processor to cause the UE to:
determine that the resource indicator in the connection release message indicates information associated with the set of resources.

29. The apparatus of claim 28, wherein the instructions are further executable by the processor to cause the UE to:
release, based at least in part on the determining, the set of resources to use for grant-free uplink transmissions while operating in the disconnected state.

30. The apparatus of claim 27, wherein the instructions are further executable by the processor to cause the UE to:
determine that the resource indicator in the connection release message implicitly indicates information associated with the set of resources.

31. The apparatus of claim 30, wherein the instructions are further executable by the processor to cause the UE to:
release, based at least in part on the determining, the set of resources to use for grant-free uplink transmissions while operating in the disconnected state.

32. The apparatus of claim 27, wherein the instructions are further executable by the processor to cause the UE to:
determine that the set of resource are unused for a time period, wherein the set of resources are considered to have been released by the base station based at least in part on the determining.

33. The method of claim 32, wherein the instructions are further executable by the processor to cause the UE to:
receive a signal from the base station configuring the time period.

34. The method of claim 27, wherein the instructions are further executable by the processor to cause the UE to:
receive a signal from the base station configuring the threshold number of transmission occasions.

35. The apparatus of claim 27, wherein the instructions are further executable by the processor to cause the UE to:
receive a release message from the base station de-configuring the set of resources.

36. The apparatus of claim 27, wherein the instructions are further executable by the processor to cause the UE to:
determine that a clock drift level has degraded below a threshold level, wherein the set of resources are considered to have been released by the base station based at least in part on the determining.

37. The apparatus of claim 27, wherein the instructions are further executable by the processor to cause the UE to:
determine that no acknowledgement for the grant-free uplink transmission was receive from the base station, wherein the set of resources are considered to have been released by the base station based at least in part on the determining.

38. The apparatus of claim 27, wherein the instructions are further executable by the processor to cause the UE to:
determine that the UE has no data for transmission in the grant-free uplink transmission; and
transmit, based at least in part on the UE having no data for transmission, a dummy payload as the grant-free uplink transmission to preserve the set of resources.

39. An apparatus for wireless communication at a base station, comprising: a processor, memory coupled with the processor; and instructions stored in the memory and executable by the processor to cause the base station to:
configure a set of resources for a user equipment (UE) to use for grant-free uplink transmissions while the UE is operating in a disconnected state;
transmit a connection release message that includes a resource indicator to the UE, the resource indicator indicating the set of resources configured for the UE, the connection release message transitioning the UE from a connected state to the disconnected state;
receive, while the UE is operating in the disconnected state, the grant-free uplink transmissions from the UE using the set of resources configured for the UE, wherein the set of resources are released upon one or more conditions satisfying a threshold; and
determine that the set of resource are unused for a threshold number of transmission occasions, wherein the conditions satisfying the threshold comprise at least the set of resources being considered to have been released based at least in part on the determining.

40. The apparatus of claim 39, wherein the instructions are further executable by the processor to cause the base station to:
configure the resource indicator in the connection release message to implicitly indicate information associated with the set of resources.

41. The apparatus of claim 40, wherein the instructions are further executable by the processor to cause the base station to:
release, based at least in part on the configuring, the set of resources.

42. The apparatus of claim 39, wherein the instructions are further executable by the processor to cause the base station to:
configure the resource indicator in the connection release message to indicate information associated with the set of resources.

43. The apparatus of claim 42, wherein the instructions are further executable by the processor to cause the base station to:
release, based at least in part on the configuring, the set of resources.

44. The apparatus of claim 39, wherein the instructions are further executable by the processor to cause the base station to:
determine that the set of resource are unused for a time period; and
release the set of resources based at least in part on the determining.

45. The method of claim 44, wherein the instructions are further executable by the processor to cause the base station to:
transmit a signal to the UE configuring the time period.

46. The method of claim 39, wherein the instructions are further executable by the processor to cause the base station to:
transmit a signal to the UE configuring the threshold number of transmission occasions.

47. The apparatus of claim 39, wherein the instructions are further executable by the processor to cause the base station to:
transmit a release message to the UE de-configuring the set of resources.

48. The apparatus of claim 47, wherein the instructions are further executable by the processor to cause the base station to:
determine that the UE is associated with a defined access class, wherein the release message is transmitted based at least in part on the determining.

49. The apparatus of claim 48, wherein the defined access class comprises an grant-free uplink resource configured access class.

50. The apparatus of claim 47, wherein the instructions are further executable by the processor to cause the base station to:
determine that the UE has transitioned from the disconnected state to the connected state, wherein the release message is transmitted based at least in part on the determining.

51. The apparatus of claim 47, wherein the instructions are further executable by the processor to cause the base station to:
determine that a paging message is to be transmitted to the UE, wherein the release message is transmitted based at least in part on the determining and the paging message comprises the release message.

52. The apparatus of claim 51, wherein the paging message comprises a resource release cause.

53. An apparatus for wireless communication at a user equipment (UE), comprising:
means for receiving a connection release message, the connection release message including a resource indicator indicating that a set of resources are to be used for grant-free uplink transmissions by the UE while operating in a disconnected state;
means for transitioning from a connected state to a disconnected state based at least in part on the connection release message;
means for performing, while operating in the disconnected state, the grant-free uplink transmissions using the set of resources, wherein the set of resources are released upon one or more conditions satisfying a threshold; and
means for determining that the set of resource are unused for a threshold number of transmission occasions, wherein the conditions satisfying the threshold comprises at least the set of resources being considered to have been released by the base station based at least in part on the determining.

54. An apparatus for wireless communication at a base station, comprising:
means for configuring a set of resources for a user equipment (UE) to use for grant-free uplink transmissions while the UE is operating in a disconnected state;
means for transmitting a connection release message that includes a resource indicator to the UE, the resource indicator indicating the set of resources configured for the UE, the connection release message transitioning the UE from a connected state to the disconnected state;
means for receiving, while the UE is operating in the disconnected state, the grant-free uplink transmissions from the UE using the set of resources configured for the UE, wherein the set of resources are released upon one or more conditions satisfying a threshold; and
means for determining that the set of resource are unused for a threshold number of transmission occasions, wherein the conditions satisfying the threshold comprise at least the set of resources being considered to have been released based at least in part on the determining.

55. A non-transitory computer-readable medium storing code for wireless communication at a user equipment (UE), the code comprising instructions executable by a processor to:
receive a connection release message, the connection release message including a resource indicator indicating that a set of resources are to be used for grant-free uplink transmissions by the UE while operating in a disconnected state;
transition from a connected state to a disconnected state based at least in part on the connection release message;
perform, while operating in the disconnected state, the grant-free uplink transmissions using the set of resources, wherein the set of resources are released upon one or more conditions satisfying a threshold; and
determine that the set of resource are unused for a threshold number of transmission occasions, wherein the conditions satisfying the threshold comprise at least the set of resources being considered to have been released based at least in part on the determining.

56. A non-transitory computer-readable medium storing code for wireless communication at a base station, the code comprising instructions executable by a processor to:
- configure a set of resources for a user equipment (UE) to use for grant-free uplink transmissions while the UE is operating in a disconnected state;
- transmit a connection release message that includes a resource indicator to the UE, the resource indicator indicating the set of resources configured for the UE, the connection release message transitioning the UE from a connected state to the disconnected state;
- receive, while the UE is operating in the disconnected state, the grant-free uplink transmissions from the UE using the set of resources configured for the UE, wherein the set of resources are released upon one or more conditions satisfying a threshold; and
- determine that the set of resource are unused for a threshold number of transmission occasions, wherein the conditions satisfying the threshold comprise at least the set of resources being considered to have been released based at least in part on the determining.

* * * * *